United States Patent
Sillanpää

(10) Patent No.: US 12,063,559 B2
(45) Date of Patent: Aug. 13, 2024

(54) METHOD AND APPARATUS FOR COMPLEMENTARY AND EQUIVALENT NETWORK SLICE DEPLOYMENT IN A NETWORK ENVIRONMENT

(71) Applicant: NOKIA TECHNOLOGIES OY, Espoo (FI)

(72) Inventor: Anna Sillanpää, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/477,778

(22) PCT Filed: Jan. 22, 2018

(86) PCT No.: PCT/FI2018/050042
§ 371 (c)(1),
(2) Date: Jul. 12, 2019

(87) PCT Pub. No.: WO2018/134483
PCT Pub. Date: Jul. 26, 2018

(65) Prior Publication Data
US 2019/0373520 A1      Dec. 5, 2019

Related U.S. Application Data

(60) Provisional application No. 62/449,361, filed on Jan. 23, 2017.

(51) Int. Cl.
*H04W 36/00* (2009.01)
*H04W 24/02* (2009.01)
(Continued)

(52) U.S. Cl.
CPC ....... *H04W 36/0072* (2013.01); *H04W 36/14* (2013.01)

(58) Field of Classification Search
CPC .......................... H04W 36/0072; H04W 36/14
(Continued)

(56) References Cited

U.S. PATENT DOCUMENTS

2017/0086118 A1* 3/2017 Vrzic .................. H04W 36/26
2018/0317148 A1* 11/2018 Jin ...................... H04W 36/08
(Continued)

FOREIGN PATENT DOCUMENTS

JP       2016-184853      10/2016
WO    WO 2016/192636    12/2016

OTHER PUBLICATIONS

3GPP SA WG2 Meeting #S2-118, Nov. 14-18, 2016, Reno Nevada, USA S2-167227, Nokia et al. "Update to section 8.1 Interim Agreements", dated Nov. 21, 2016 pp. 1-3.
(Continued)

*Primary Examiner* — Xuan Lu
(74) *Attorney, Agent, or Firm* — Barta Jones, PLLC

(57) ABSTRACT

A method, apparatus and computer program product are provided to allow for the allocation and/or other deployment of a complementary network slice to partially and/or fully replace a network slice associated with a piece of user equipment when the piece of user equipment moves outside of the area associated with its current network slice application. When a piece of user equipment moves outside of its current network slice, application area, its services may be provided over a complementary network slice, or a complementary network slice may be allocated for a non-supporting user equipment to be used in the RAN and/or core network. In some example implementations, the allocation and/or other use of one or more complementary network slices enables the operator to predefine and use sets of policies that may differ from those associated with a user equipment's current and/or typical network slice.

25 Claims, 16 Drawing Sheets

(51) Int. Cl.
*H04W 36/12* (2009.01)
*H04W 36/14* (2009.01)
*H04W 48/18* (2009.01)

(58) Field of Classification Search
USPC ........................................................ 370/331
See application file for complete search history.

(56) References Cited

U.S. PATENT DOCUMENTS

| | | | |
|---|---|---|---|
| 2019/0182733 A1* | 6/2019 | Shimojou | H04W 72/04 |
| 2019/0191348 A1* | 6/2019 | Futaki | H04W 36/0033 |
| 2019/0230621 A1* | 7/2019 | Dai | H04W 36/00 |
| 2019/0261187 A1* | 8/2019 | Chen | H04W 16/10 |
| 2019/0327657 A1* | 10/2019 | Han | H04W 48/18 |
| 2019/0357131 A1* | 11/2019 | Sivavakeesar | H04W 36/0016 |
| 2021/0282082 A1* | 9/2021 | Mildh | H04W 48/18 |

OTHER PUBLICATIONS

3GPP TSG RAN WG3 NR-adhoc, Spokane, USA, Jan. 17-19, 2017, R3-170065, ZTE, "Selection RAN Part Network Slice during UE mobility", dated Jan. 7, 2017, Sections 1-2, fig.4.
International Search Report and Written Opinion for International Application No. PCT/FI2018/050042 dated May 9, 2018.

* cited by examiner

METHOD AND APPARATUS FOR COMPLEMENTARY AND EQUIVALENT NETWORK SLICE DEPLOYMENT IN A NETWORK ENVIRONMENT

CROSS-REFERENCE TO RELATED APPLICATIONS

The present application is a national phase entry of International Application No. PCT/FI2018/050042, filed Jan. 22, 2018, which claims priority to U.S. Provisional Application No. 62/449,361, filed Jan. 23, 2017, the contents of which are incorporated herein by reference in their entirety.

TECHNICAL FIELD

An example embodiment relates generally to wireless network technology in the context of providing for network slicing and the allocation of network resources across network slices. Some example embodiments are directed to the allocation of a complementary network slice under certain conditions.

BACKGROUND

Recent improvements in the capabilities of networks and the mobile devices that operate within such networks have given rise to a number of technical challenges, particularly with respect to the optimization of network operation and network resource allocation. As advanced, next-generation networks and the infrastructure used to facilitate such networks are progressively implemented, these challenges are compounded, particularly in situations where multiple groups of mobile device uses seek network resources and service from a network operator, and in situations where a network operator seeks to implement network slicing arrangements. These and other technical challenges have been recognized and solved in the course of developing the invention described and otherwise referenced herein.

BRIEF SUMMARY

A method, apparatus and computer program product are therefore provided in accordance with an example embodiment in order provide a complementary network (NW) slice in a sliced network environment. In this regard, the method, apparatus and computer program product of an example embodiment contemplate the allocation of a complementary NW slice to allow for network services to be provided to a piece of user equipment (UE) and/or a subscriber within a sliced network environment when the UE moves outside of its current or typical NW slice application area. Some example implementations of the embodiments disclosed or otherwise contemplated herein also provide for the allocation of a NW slice to a radio access network (RAN) and/or a core network for use in connection with a UE that does not otherwise support the use of an NW slice.

BRIEF DESCRIPTION OF THE DRAWINGS

Figure 1:
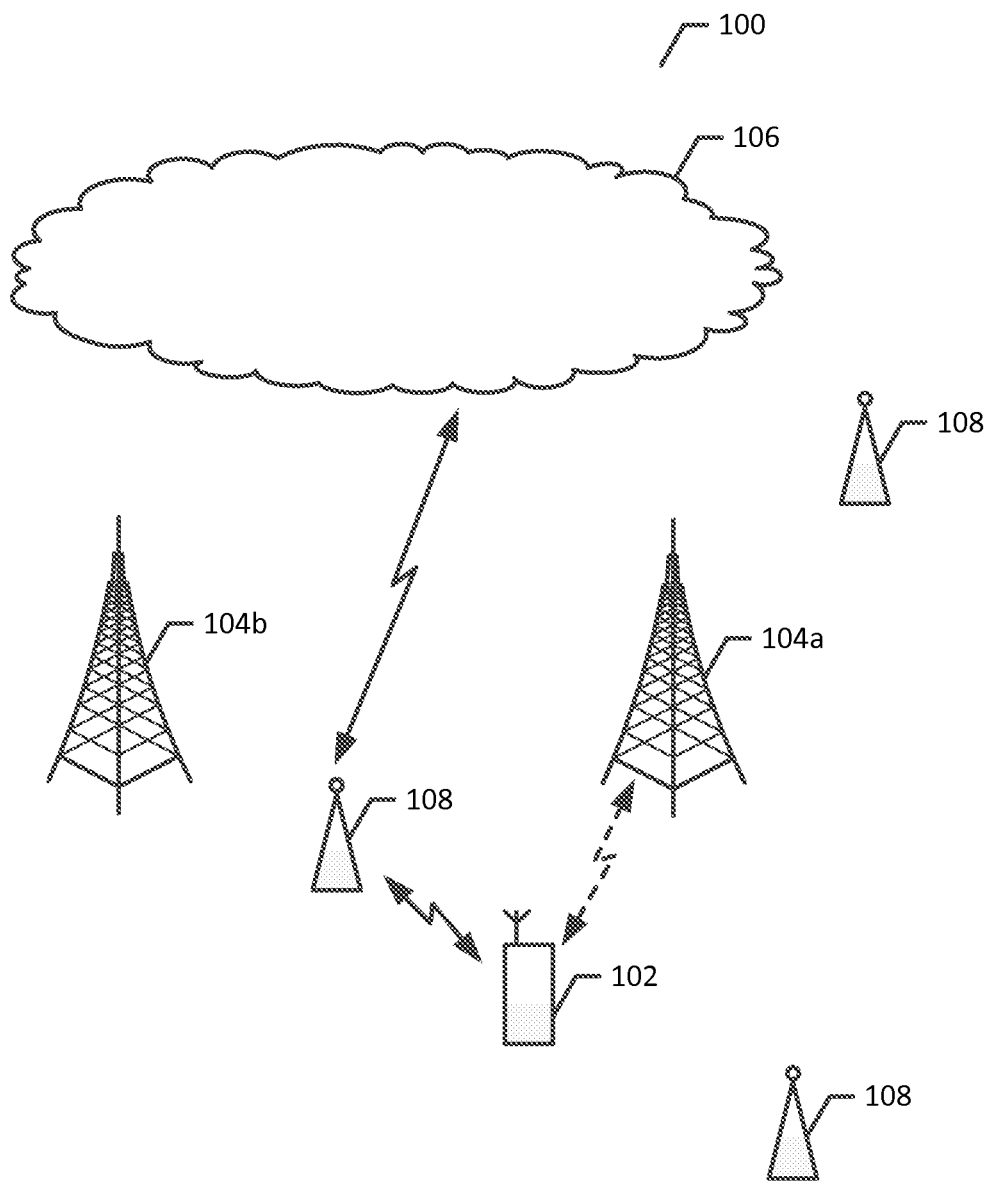
Figure 2:
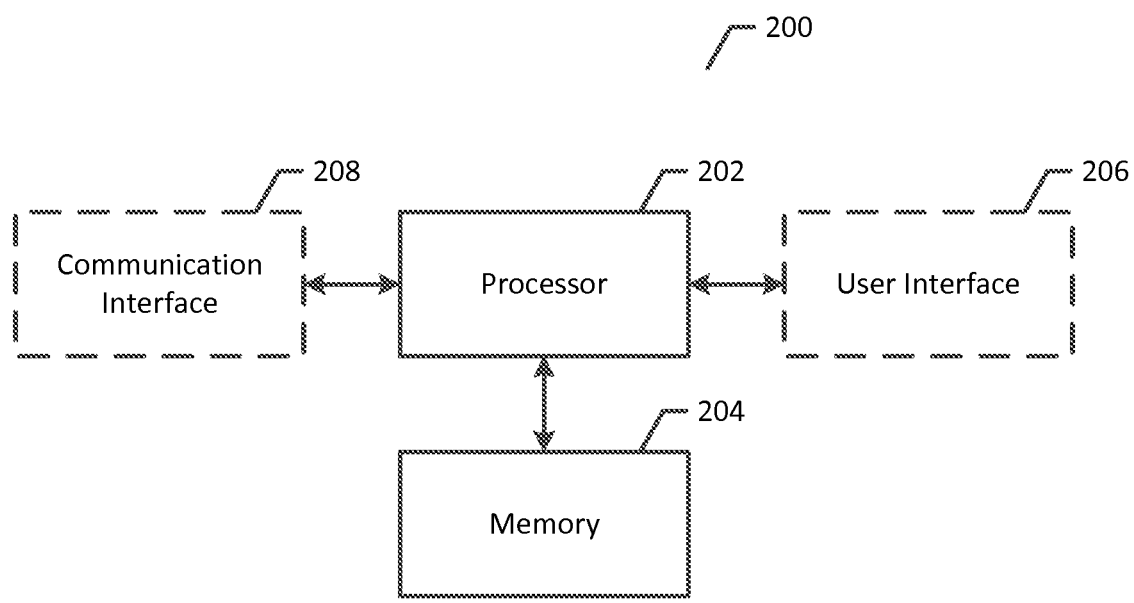
Figure 3:
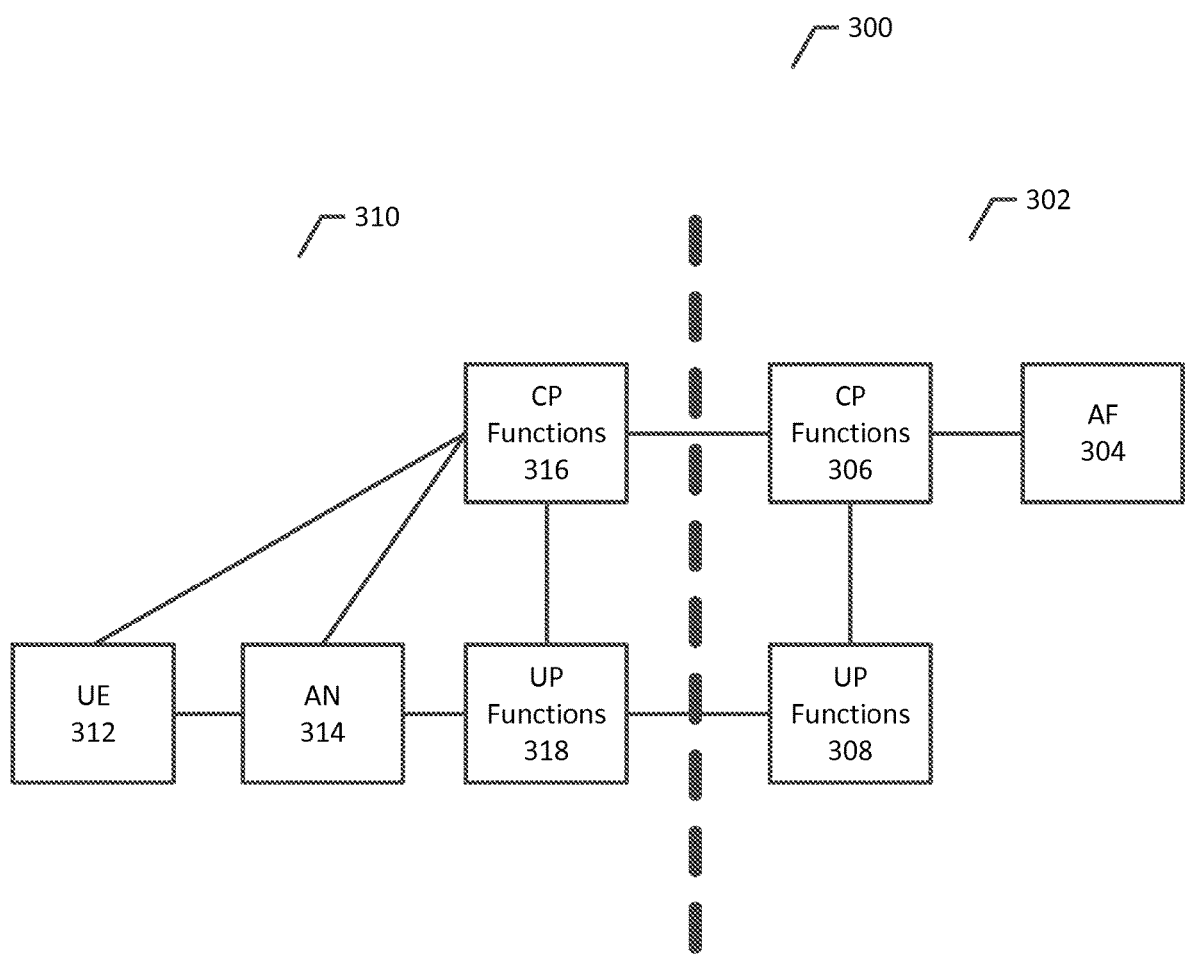
Figure 4:
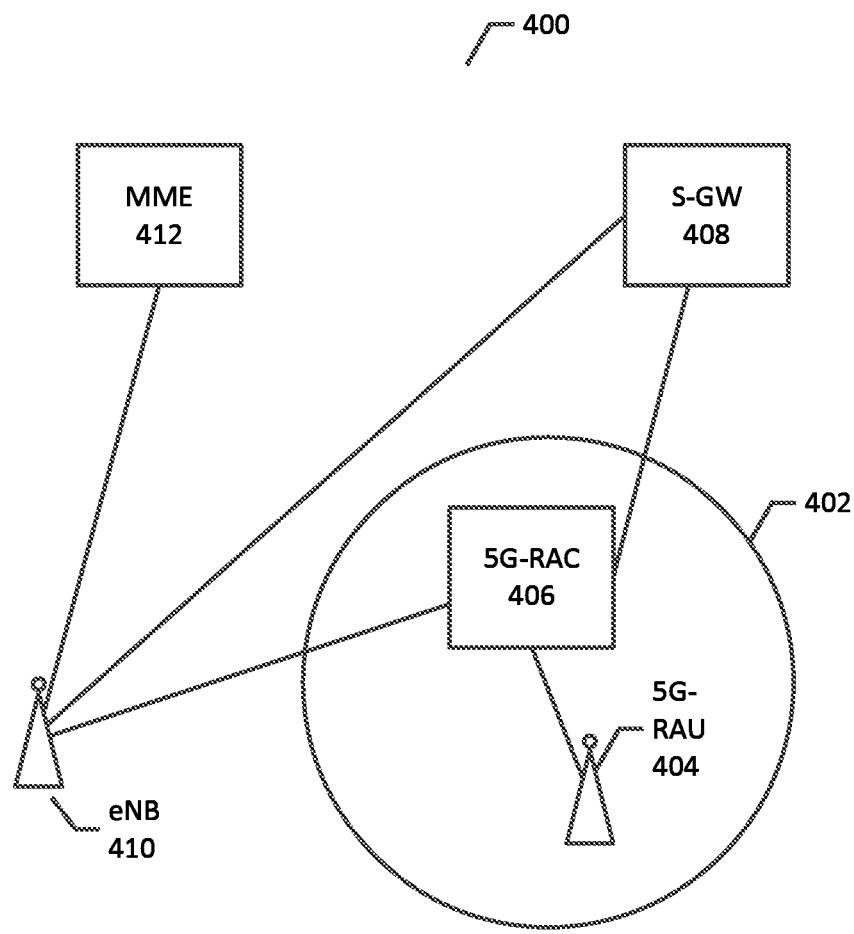
Figure 5:
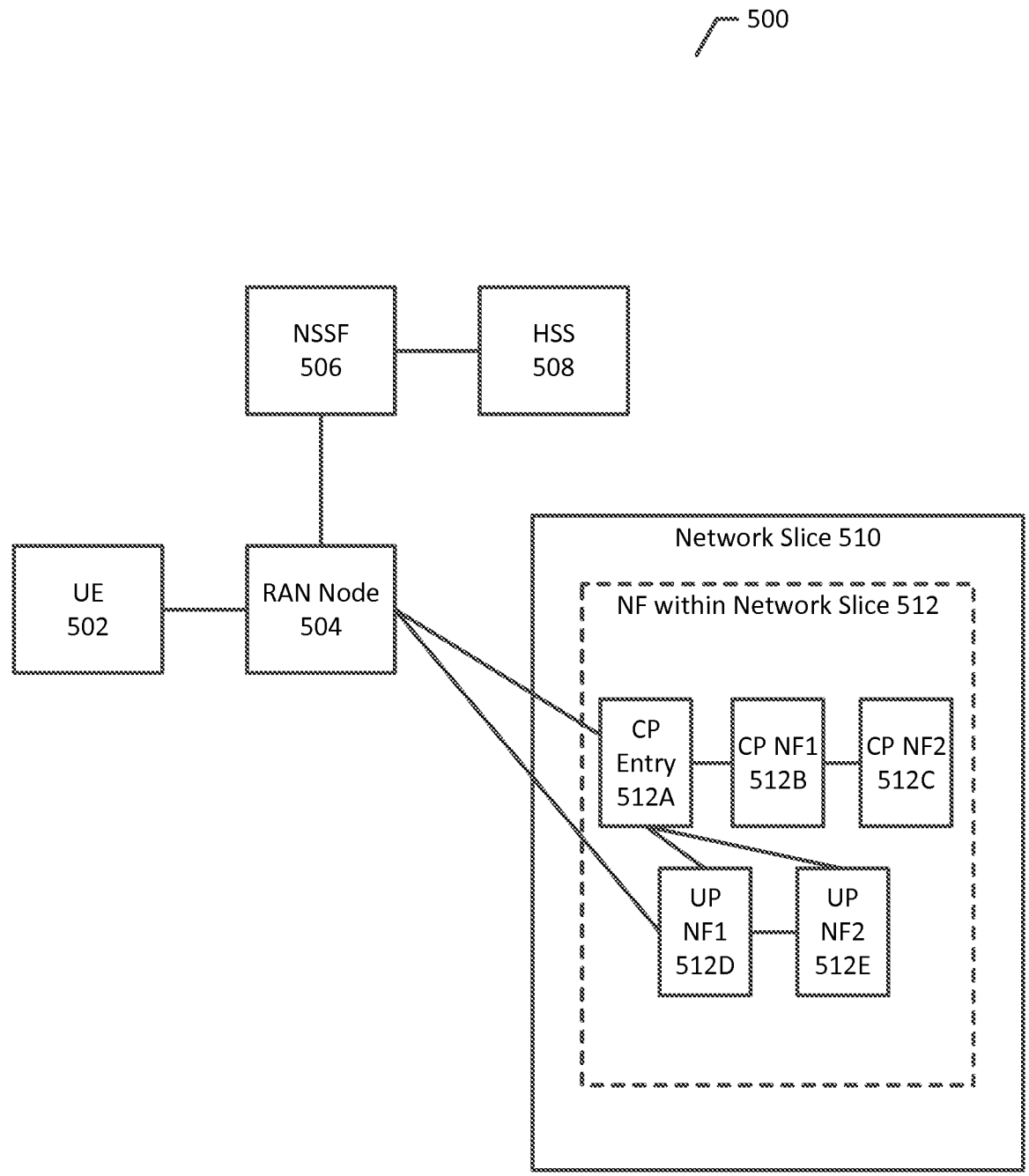
Figure 6:
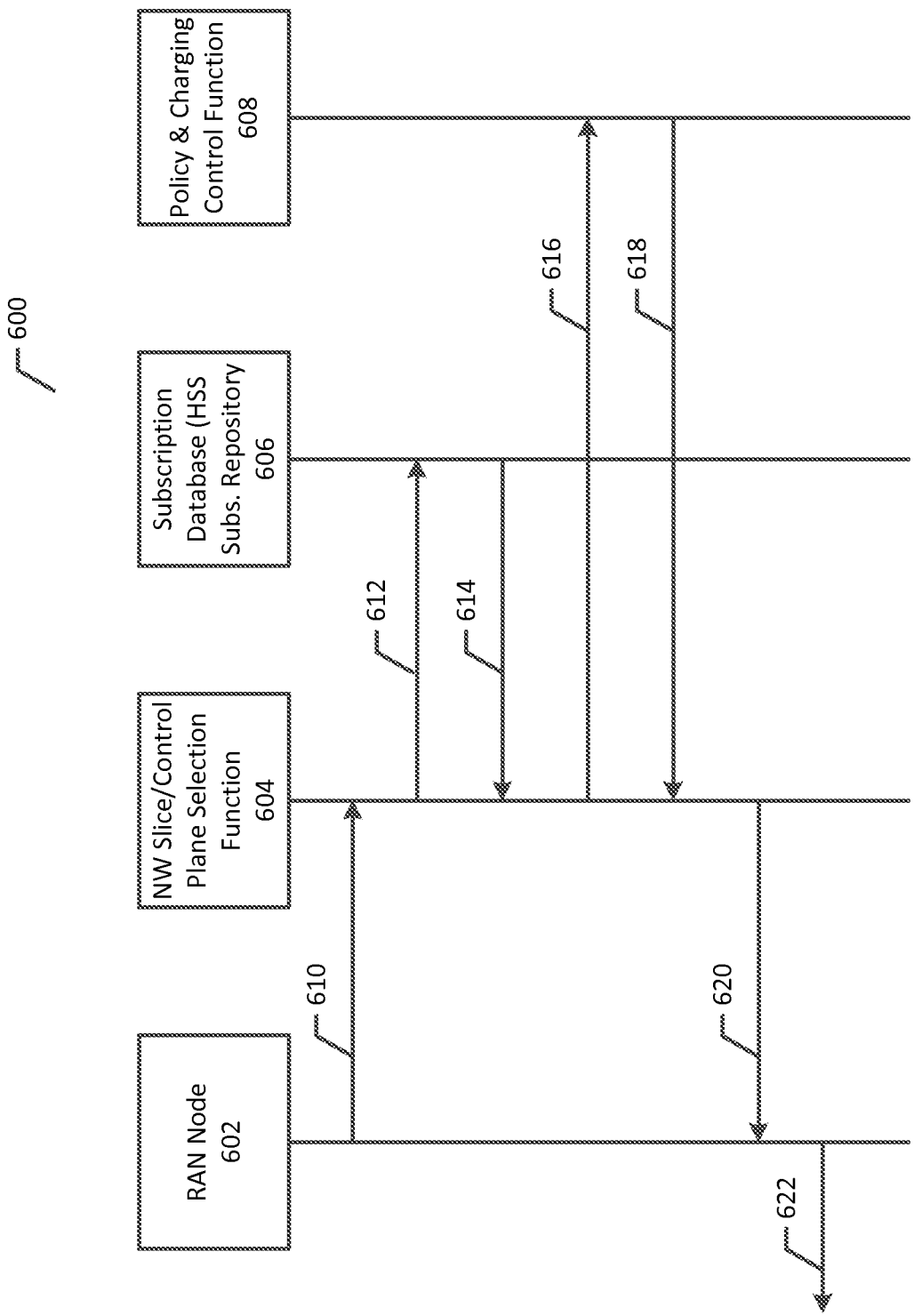
Figure 7:
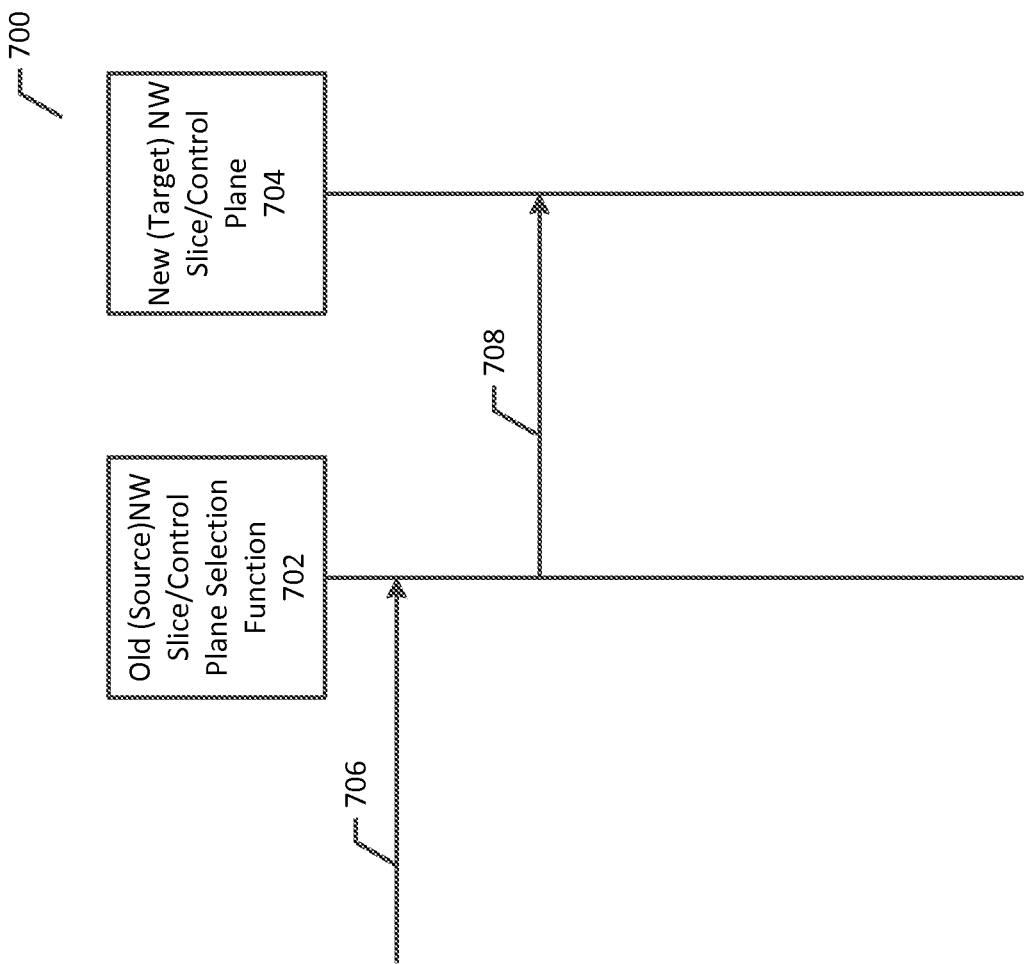
Figure 8:
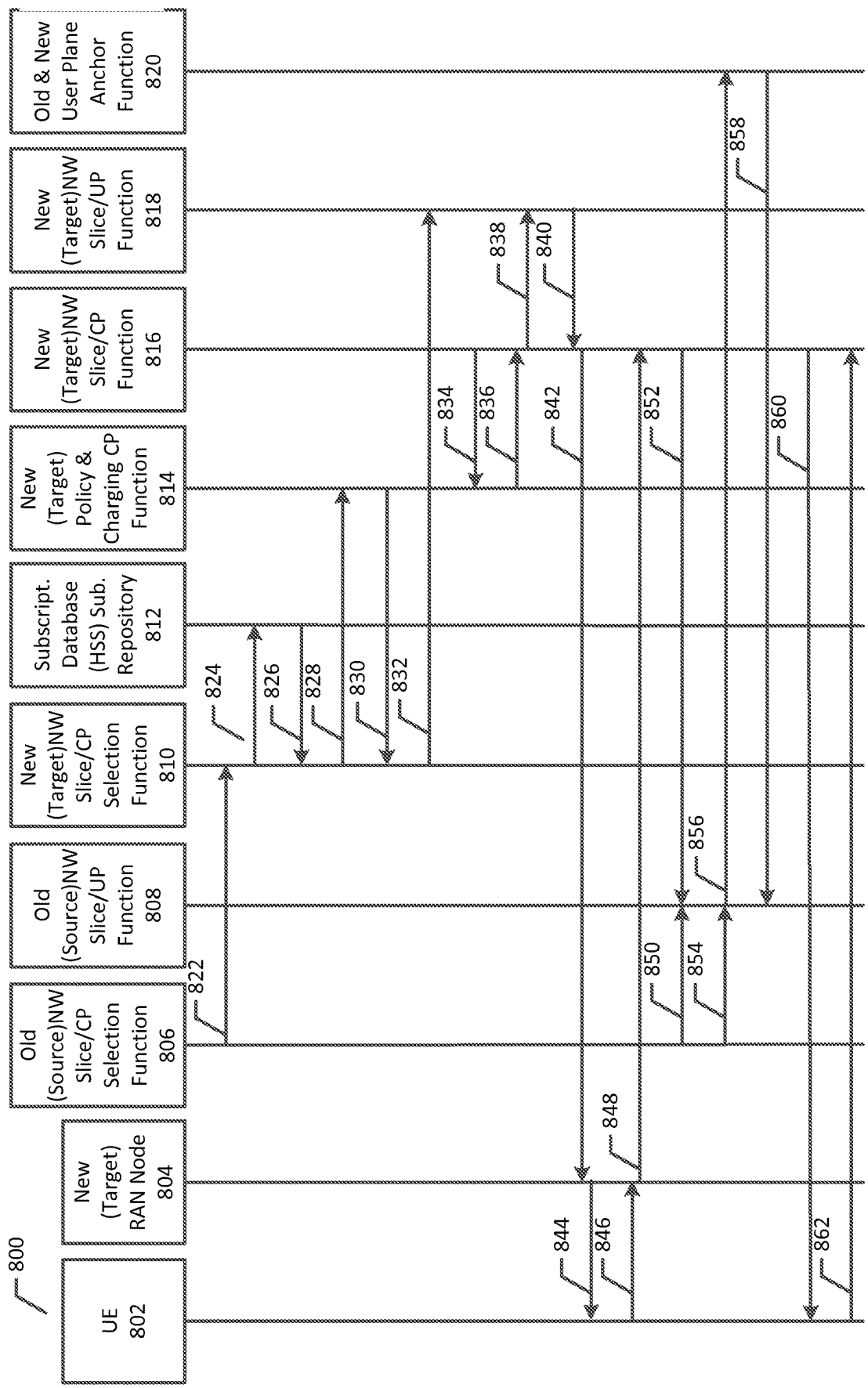
Figure 9:
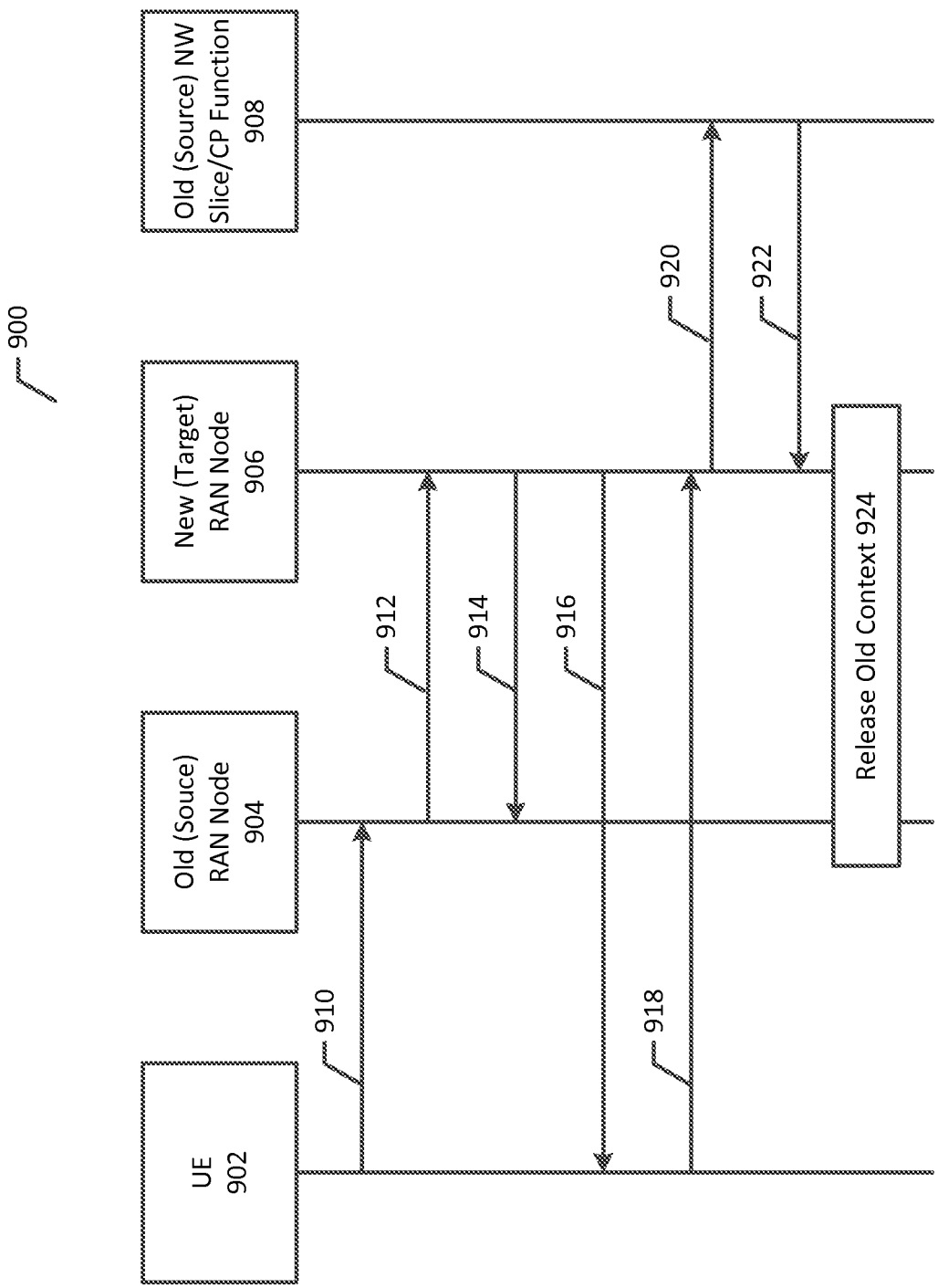
Figure 10:
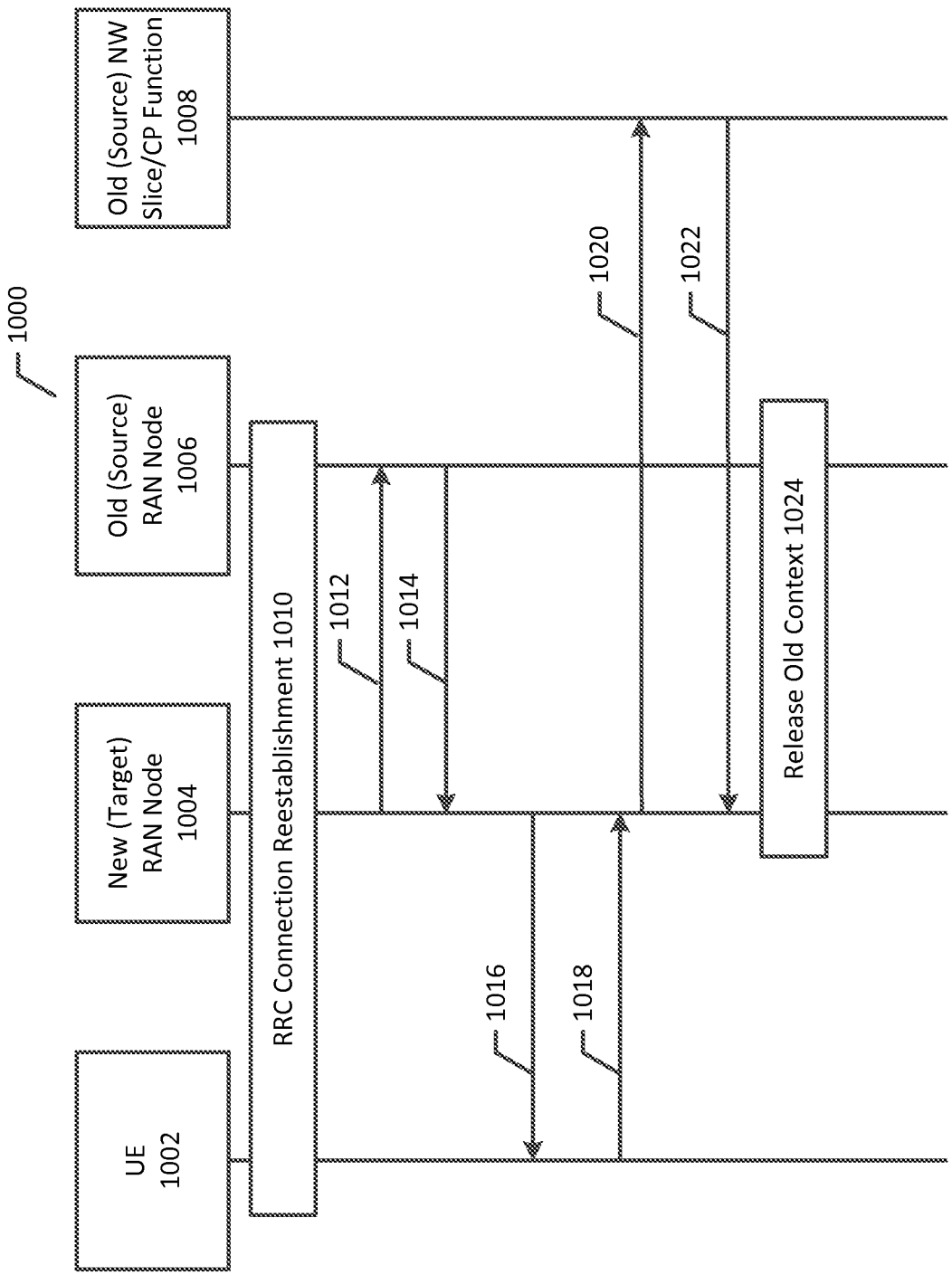
Figure 11:
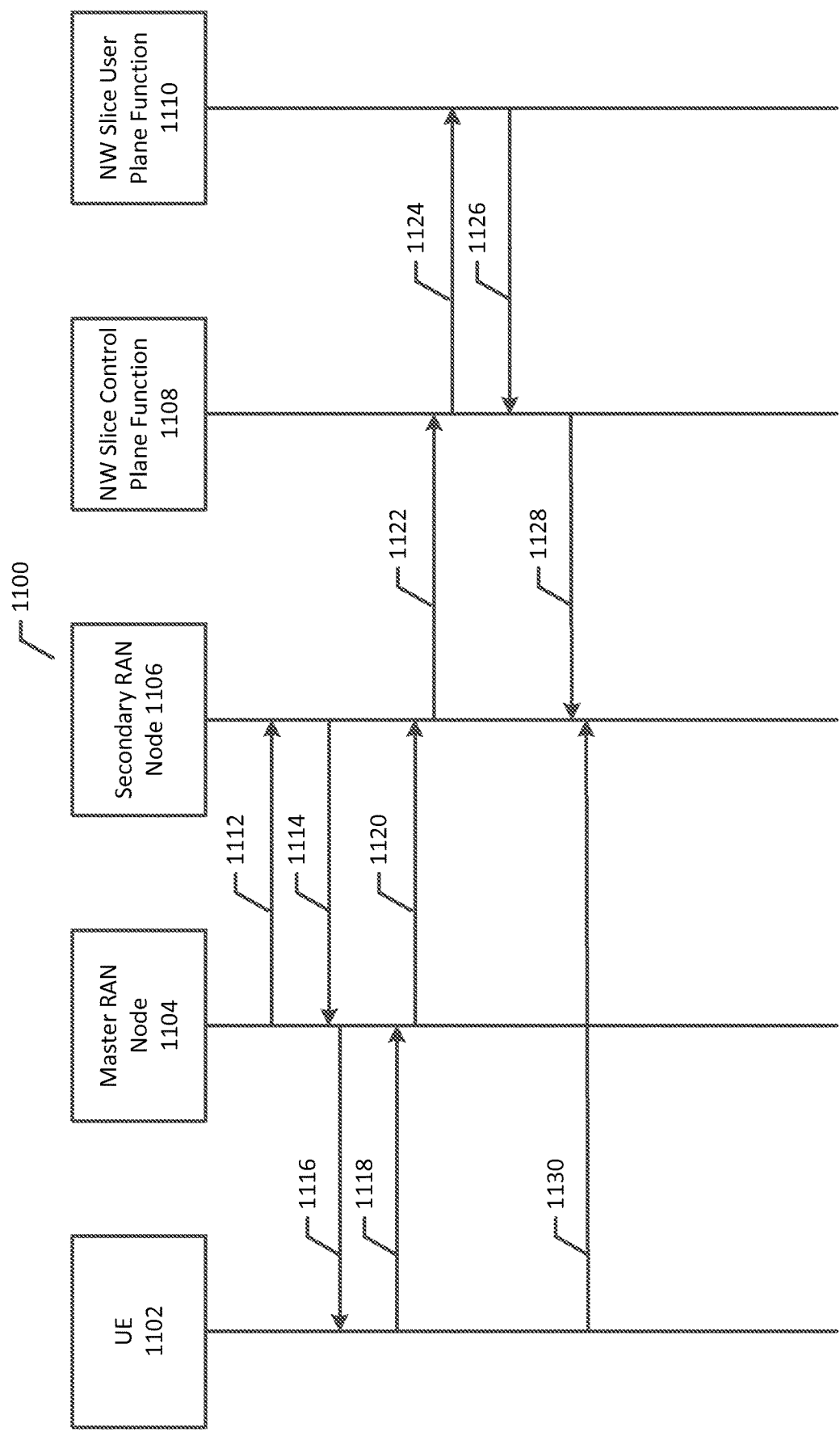
Figure 12:
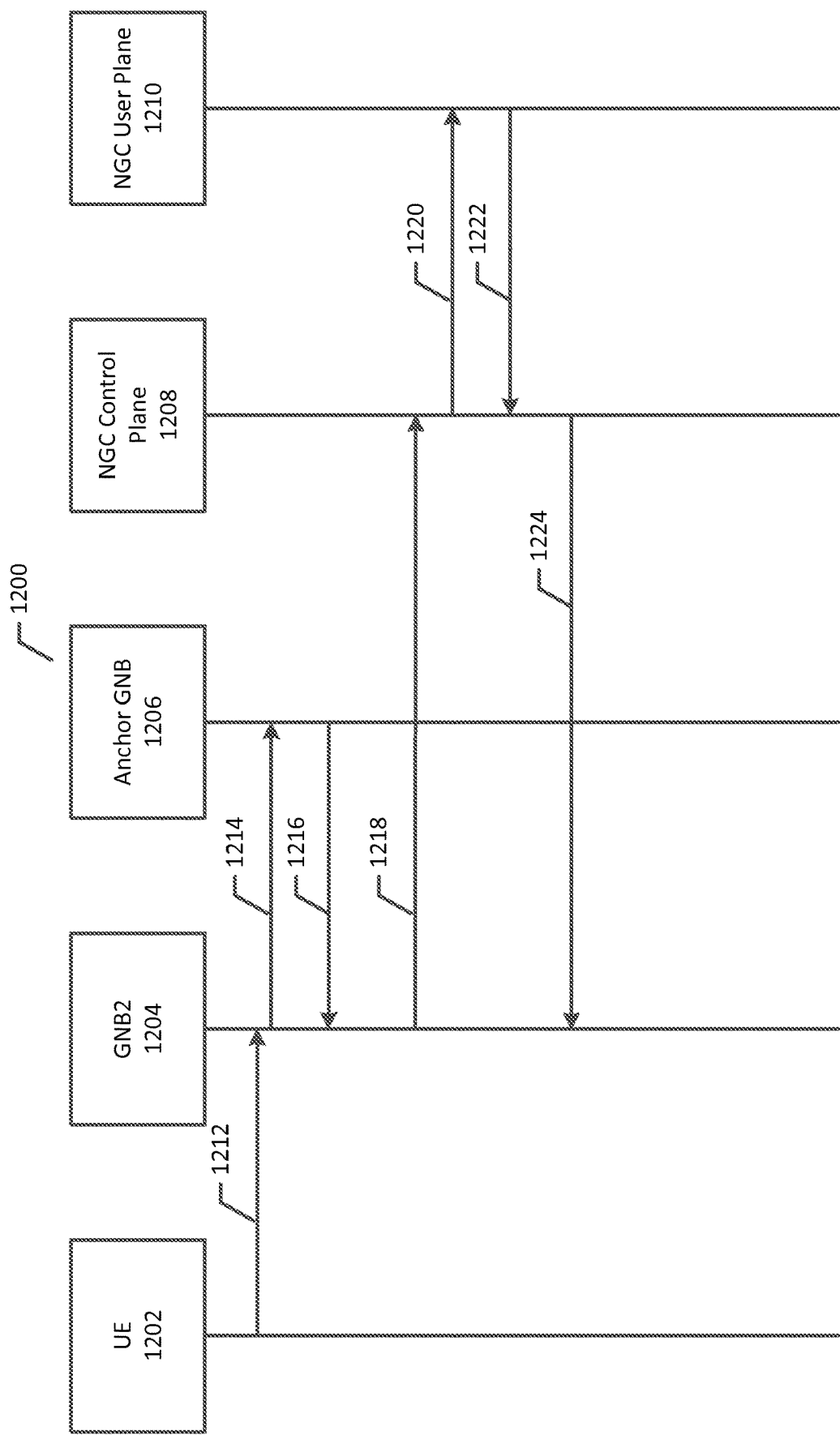
Figure 13A:
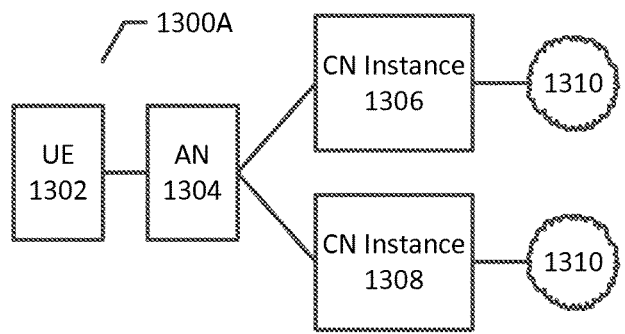
Figure 13B:
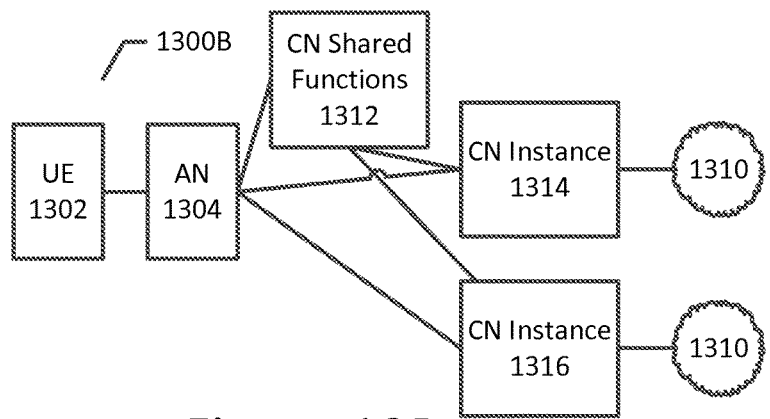
Figure 13C:
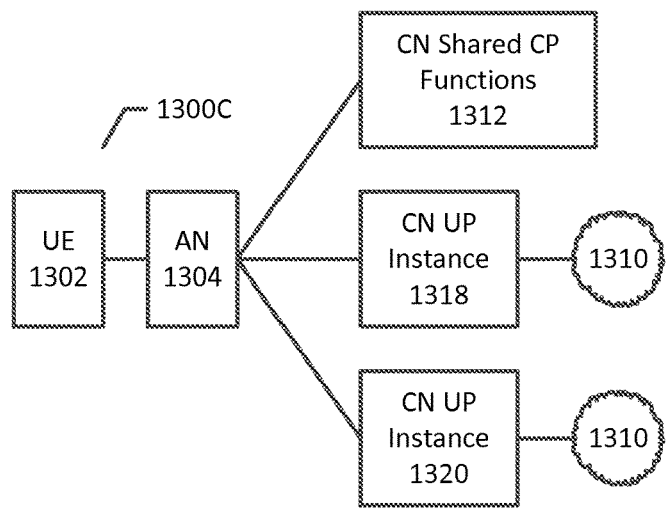
Figure 14:
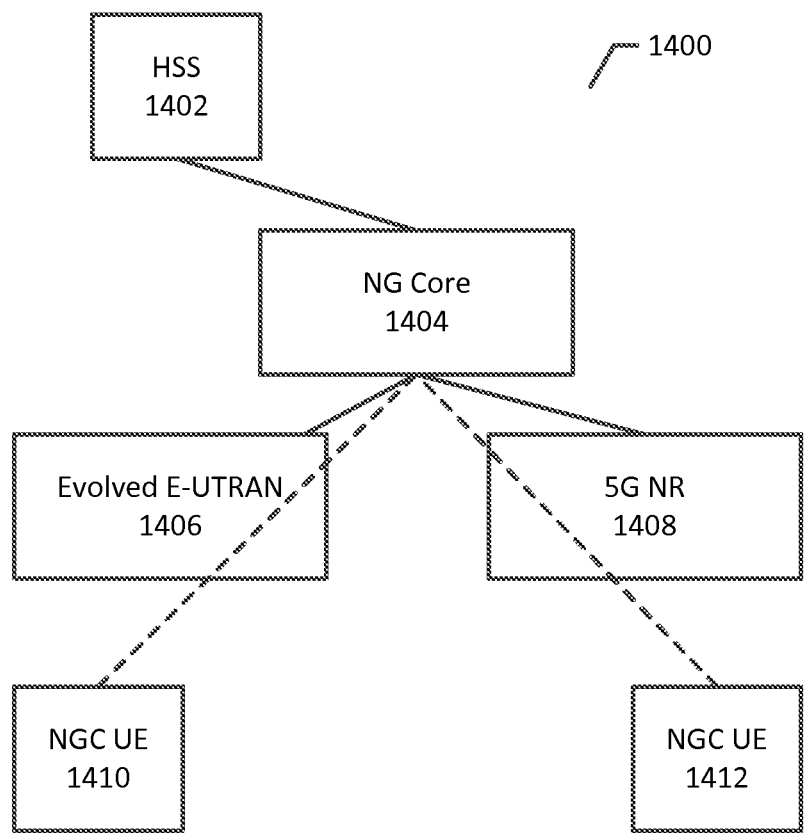
Figure 15:
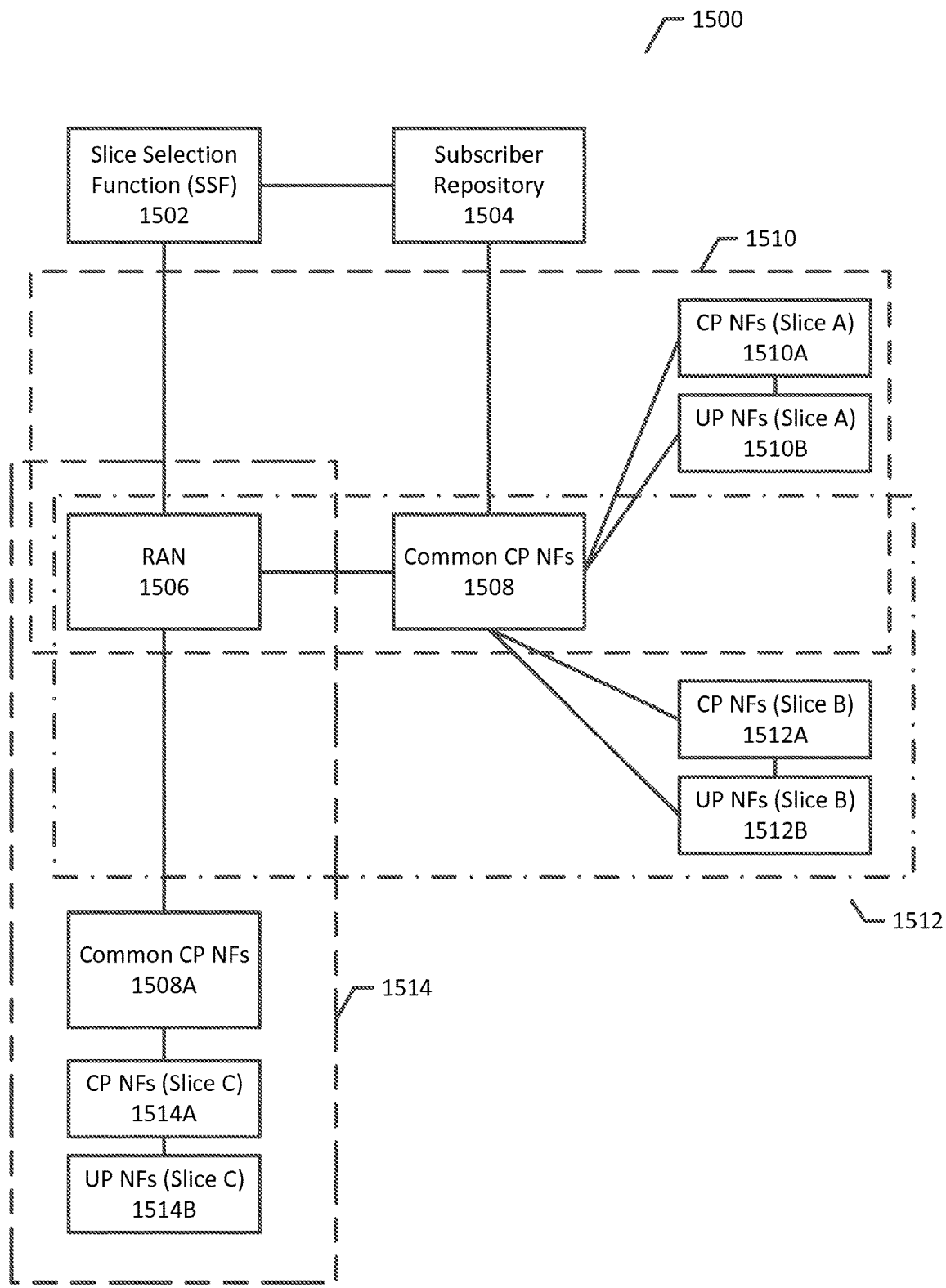
Figure 16:
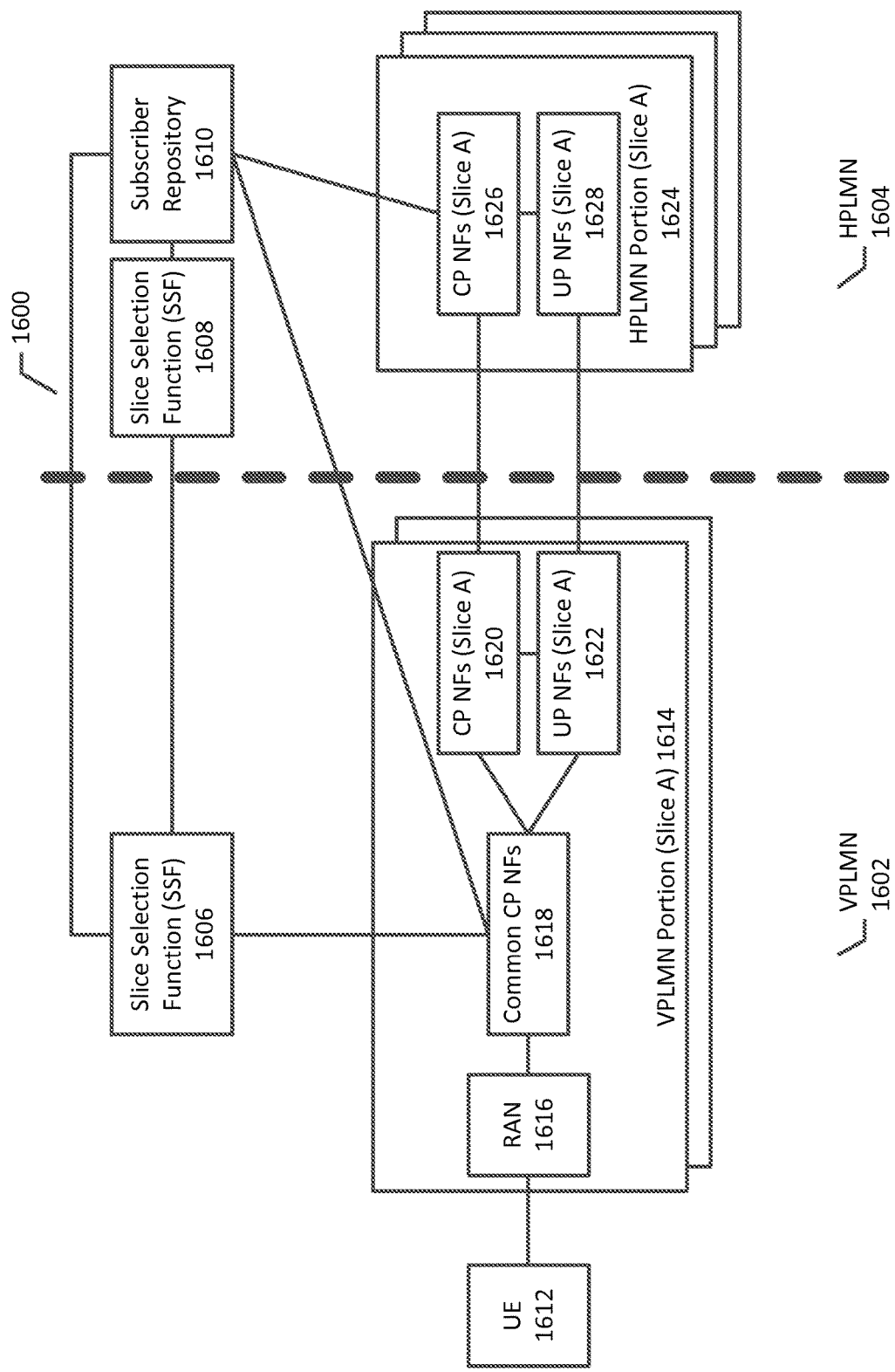

Having thus described certain example embodiments of the present disclosure in general terms, reference will hereinafter be made to the accompanying drawings, which are not necessarily drawn to scale, and wherein:

FIG. 1 depicts an example system environment in which implementations in accordance with an example embodiment of the present invention may be performed;

FIG. 2 is a block diagram of an apparatus that may be specifically configured in accordance with an example embodiment of the present invention;

FIG. 3 is a block diagram of an example system architecture that may be used in accordance with an example embodiment of the present invention;

FIG. 4 depicts an example system environment in which implementations in accordance with an example embodiment of the present invention may be performed;

FIG. 5 depicts an example network portion in which implementations in accordance with an example embodiment of the present invention may be performed;

FIG. 6 is message flow diagram illustrating aspects of an example embodiment of the present invention;

FIG. 7 is another message flow diagram illustrating aspects of an example embodiment of the present invention;

FIG. 8 is another message flow diagram illustrating aspects of an example embodiment of the present invention;

FIG. 9 is another message flow diagram illustrating aspects of an example embodiment of the present invention;

FIG. 10 is another message flow diagram illustrating aspects of an example embodiment of the present invention;

FIG. 11 is another message flow diagram illustrating aspects of an example embodiment of the present invention;

FIG. 12 is another message flow diagram illustrating aspects of an example embodiment of the present invention;

FIGS. 13A, 13B and 13C depict example network arrangements in which implementations in accordance with example embodiments of the present invention may be performed;

FIG. 14 depicts an example system environment in which implementations in accordance with an example embodiment of the present invention may be performed;

FIG. 15 depicts a block diagram of control plane interfaces for network slicing with common and slice-specific functions in which implementations in accordance with an example embodiment of the present invention may be performed; and FIG. 16 depicts a block diagram of a roaming reference architecture with supporting slicing, in which implementations in accordance with an example embodiment of the present invention may be performed.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Several terms and abbreviations associated with network slices and related information are used throughout this disclosure for the purposes of clarity. For example, the term "network slice instance (NSI) refers to an instantiation of a slice. The term "network slice selection assistance information" (NSSAI) refers to the information associated with a tenant and slice type, and may refer to a combination of multiple sets of "individual network slice selection assistance information" (I-NSSAI), which typically point to a particular template of a slice with the slice type and service level agreement with the tenant identification component. However it should be appreciated that the use of these terms is merely indicative, and the use of any one of these terms (NSI, NSSAI, I-NSSAI) should be understood to cover any of them and/or all of them.

A method, apparatus and computer program product are provided in accordance with example embodiments in order to provide and/or otherwise allocate a complementary NW slice to a piece of user equipment and/or subscriber in situations that may arise within a network environment that incorporates network slicing and/or aspects of network slicing, such as fifth generation (5G) networks, and/or hybrid networks that incorporate network portions exhibiting aspects of 5G network protocols, for example.

Some network architects and developers have postulated that implementations of network slicing may provide a viable approach to accommodating the ever-increasing demands for improved network performance and enhance network capabilities, and have contemplated incorporating network slicing into 5G network standards. While network slicing has the potential to provide a number of potential advantages and support a number of advancements in the capabilities of widely-deployed wireless networks, the use of network slicing also raises a number of technical challenges, particularly in situations where user equipment (UE) is mobile and/or when legacy UE that is incapable of supporting and/or otherwise taking advantage of NW slicing remain active within a network environment.

One such technical challenge arises in situations where a NW slice are may end, but the need to provide service to a UE remains. This challenge may be compounded in situations where there is no proper NW slice in use and/or available for the UE, in situations where the UE is not able to receive and/or modify the NW slice, and/or the operator of the network wishes to organize its network resources under various NW slice instances to allocate resources and/or services.

Example embodiments of the invention disclosed and otherwise contemplated herein address such technical challenges through the implementation and allocation of a complementary NW slice. Typically, when a UE moves and the NW slice area ends (such as if the UE moves outside the area associated with its "home" or previous NW slice), then another NW slice can be used instead to provide the ongoing (or new) service(s), such that there is no need to terminate or disallow the service continuation and/or new service invocation. While the QoS, bit rates, allowed services and the like within the new NW slice may not be exactly the same as in the earlier (home NW slice) the new NW slice nonetheless allows service to continue for the UE. It will be appreciated that the allocation and/or use of a new NW slice can occur between core NWs, RANs, core+RAN networks, and the like. The new adopted NW slice in that case can be a) indicated to some and/or all of the peer entities (such as between core NWs, RANs, core+RAN(s), and the like, for example), and/or b) to the UE, and/or c) kept within the new elements as well (based on peer capabilities, for example). In some situations, the new adopted NW slice can also be adopted only in a core NW, RAN, or the like. In some such situations, the new adopted NW slice may be authorized by an element in a home NW or a visited NW, based on local configurations or information from a home network and/or from such elements as a UE control plane, an HSS/subscriber repository, an PCEF/PCRF/policy and charging control element, or the like, for example. Moreover, a complementary NW slice may also be allocated without requiring movement by a UE to allow increase or decrease in terms of better, worse or different QoS/network resource allocation/bit rates, services, applications, different charging plans or combinations of these (such as if subscription information is changed, a certain quota is exceeded, such as a monthly quota, bit rate quota so that some services get lower QoS due to exceeding an predetermined or otherwise normal and/or basic quota, for example).

In situations when a UE moves outside of its current NW slice application area, NW services to the UE can be provided over a complementary NW slice. In some example implementations, such as those that arise in situations where a UE does not support NW slicing, a complementary NW slice may be allocated for use by the RAN and/or core network to allow the UE to continue to receive network services. Through the allocation of a complementary NW slice, the operator of a network can pre-define and use a set of policies for various groups of subscribers. For example, such sets of policies could address and/or otherwise cover various default and non-default settings for access and/or admission control, QoS and/or QoS policies, resource reservation and prioritization, charging policies, services offered (including but not limited to application services, such as voice over IP (VoIP), voice over LTE (VoLTE), and/or the like, for example), and/or NW services, such as high bit rates for example. Some example implementations also contemplate satisfying needs for complementary NW slices in the context of emergency cases, high priority situations, situations without authorization and/or admission control, and/or situations involving pre-emption as need and/or applicable (such as situations involving lower-priority enhanced mobile broadband (eMBB) users and/or other specific lower priorities), for example.

The use of a complementary NW slice to fully and/or partially replace a normal NW slice may be particularly applicable in a number of situations, and may be adapted to reflect the underlying situation and related technical challenges. In some example implementations, the complementary NW slice may be configured as a partial NW slice, such that it only covers and/or otherwise provides services to the part of NW that the current and/or normal NW slice used by a UE is not covering. This may be particularly applicable in situations where most of the service is provided by the current normal NW slice and the "complementary" NW slice is only used to cover the remaining part which is not covered by the current normal slice. For example, a complementary NW slice could be allocated and/or otherwise implemented to cover certain mobility options (such as, connected and idle modes and/or active and inactive statuses, for example) or non-mobile options and their combinations. On such example may include situations where a UE need services related to one or more of intra-RAT inter cell/frequency/band, between carriers service (including but not limited to carrier aggregation and interworking/dual connectivity options, for example), intra-RAT and/or inter-5G NB/LTE and/or eNB/WLAN access points, inter-RAT, inter-CCNF, and/or inter control plane element services (such as next generation core CPF and/or MME, for example), inter user plane element contexts (such as next generation core UPF contexts, for example), and/or inter-PLMN and/or small cell/SIPA/LIPTO deployments. As such, a complementary NW slice could be used in connection with some or all core network elements, in some or all RAN network elements and/or in some or all transport network elements in a given context and/or network environment.

In some example implementations, the complementary slice may be used to fully cover the NW resources required by a UE and, in some such situations, serve as the only network slice used by the UE. For example, if the UE initiates the service in an area where the normal NW slice is not valid (such as in an area outside the relevant basic subscription area, for SIPA/LIPTO deployment, and/or for a VPLMN roaming case using local VPLMN GW, for example). In such a case, the complementary NW slice may be typically selected at the time of UE attach or registration, when the UE is moves or the UE powers on outside the normal and/or typical NW slice area, and/or at the time of service initiation, for example.

In some example implementations the UE may be provided with the complementary NW slice. However, in other example implementations the NW slice may be provided only within the NW to various other NW elements. Moreover, the NW slice may be configured, for example, to cover all and/or some of the services used within the a given NW slice instance (which may be referred to as I-NSSAI, for example) or set of NW slice instances (which may be referred to as NSSAI, for example).

While some of the examples discussed and referred to herein present a single UE and/or a single complementary NW slice for the purposes of clarity, it will be appreciated that example implementations of embodiments of the invention contemplate the use of one or more complementary NW slices that may be used in connection with one or several of a UE's NW slices (NSSAI/I-NSSAI), and/or several of a UE's normal NW slices (NSSAI(s)/I-NNSAI(s), for example). For example, one or more complementary NW slices could be mapped to one complementary NW slice (NSSAI(s)/I-NNSAI(s)), or any other combination, including but not limited to those conforming to 1:N, N:1, N:M, and/or N:N ratios. It should also be appreciated that while many of the example implementations presented herein reference and/or contemplate a radio access node (RAN), implementations of the complementary NW slices disclosed herein may be used in connection with any type of access node, including but not limited to a fixed access node. Moreover, any combination of RAN and/or AN nodes may be used in connection with the complementary NW slices disclosed and otherwise contemplated herein.

In some example implementations of embodiments of the invention, the complementary NW slice(s) in the NW may be sent to the UE before allocating it to the UE. For example, one or more complementary NW slice identifiers may be sent to the UE when a UE enters a tracking area and/or the equivalent of a tracking area. In such situations, the complementary NW slice and/or an identification thereof may be broadcasted, sent per UE, programmed to the UE's SIM, and/or otherwise presented to the UE for potential access and/or other use.

While it should be appreciated that the precise protocols used in connection with establishing and interacting with instances of complementary NW slices may vary with the precise implementation of the relevant network environment, it may be advantageous in some situations to implement one or more complementary NW slice instances such that the complementary NW slice instance(s) (and original NW slice instance(s)) can be reported back in replies/acknowledgements. Such functionality may be particularly useful in situations where the NW slice was not accepted and was replaced by another complementary NW slice instance.

In some example implementations, a complementary NW slice may be configured to provide and/or otherwise contain additional information regarding whether the complementary NW slice is intended to replace the normal slice fully, or near-fully, (such as in situations involving a visited PLMN, for example) such that the UE should use the complementary NW slice to interact with the NW and/or RAN instead of the "normal" slice. Additional information may be included with the complementary NW slice. For example the information may be used to determine a paging area, may be included in a paging request, and/or may be sent back by a UE to a NW in a paging response. In some implementations, additional information associated with a complementary NW slice may be used and/or implemented in a similar manner as a service request, tracking area update and/or other mobility procedures (including but not limited to the procedures used in connection with RAN RRC signaling and core/MM NAS signaling, for example). Likewise, additional information associated with a complementary NW slice may be used and/or implemented in a manner that permits the establishments, modification, and/or removal of a session or service and/or may, for example trigger and/or constituted a reason to start, modify, and/or discontinue a service or session, for example.

In addition to the particular examples discussed in more detail herein, the use of a complementary NW slice to fully and/or partially replace a normal NW slice may be advantageous in a number of use cases. In some example implementations, a complementary NW slice may be beneficial in allocating network resources in a manner that allows a UE that does not support the use of NW slicing to interact with a network that otherwise relies on NW slicing. In other example implementations, such as those that involve networks featuring small cells, for example, one or more small cells may be associated with their own NW slice and/or complementary NW slice. In example implementations that involve intra-RAT and/or inter-RAT mobility (and particularly in situations that implicate IWK, dual connectivity, and/or carrier aggregation considerations), a RAT and/or layer, cell, and/or set of cells within the RAT may be associated with one complementary NW slice, such that different services, prioritization of resources (such as different QoS characteristics, for example), different admission control procedures, different scheduling priorities, different charging plans, or the like, for example, may be implemented in connection with the complementary NW slice.

The use of complementary NW slices may also be well-suited to situations involving roaming cases, including but not limited to situations involving the use of home PLMN and/or visited PLMN gateway and/or anchoring. In the context of emergency services (including but not limited to a public warning system (PWS) or subset of PWS, such as and Earthquake and Tsunami Warning System (ETWS), a Commercial Mobile Alert System (CMAS), or the like, for example), a special and/or otherwise dedicated complementary NW slice may be provided to facilitate communications, such as emergency calls via IMS voice, for example.

The use and allocation of complementary NW slices may also allow for load balancing within a network and/or portion of a network. For example, if a current NW slice cannot be used and/or is not preferred to be used, one or more instances of complementary NW slices may be selected and a UE may be moved to new cell, frequency, band, core network nodes, or the like by allocating it a complementary NW slice instance (NSSAI/I-NSSAI) to be used.

In some situations, a complementary NW slice may be effectively used as an equivalent NW slice. For example when a UE moves to new equivalent PLMN area, the UE's normal NW slice(s) (NSSAI(s)/I-NNSAI(s)) may be mapped to equivalent complementary NW slice(s) (NSSAI(s)/I-NNSAI(s)) in that PLMN. In another example implementation, one PDU connection, one U-plane element and an external interface could be considered part of a "normal" NW slice and another U-plane element and external interface may be associated with a complementary NW slice in a manner that is advantageous in situations involving distributed and/or centralized sites, for example.

In many of the examples disclosed herein, terms such as NSI, NSSAI, I-NSSAI, SM-NSSAI, which typically refer to network slice instances and network slice selection assistance information, are used for the purposes of clarity and simplicity. However, it should be appreciated that the use of these terms in connection with certain examples disclosed and discussed herein are not intended to unnecessarily restrict the scope of the invention disclosed herein and/or the example embodiments of the invention. Moreover, it should be appreciated that other terms may be used to reflect example situations and context where generally analogous concepts, and functionalities may be illustrative. Moreover, it should be appreciated that there may be different combinations of different ways to indicate a network slice and/or slice instance (such as MDD and/or NSSAI, for example) and their mapping to 1:1, 1:N; M:1; M:N, without departing from the scope of the invention disclosed herein.

It should be appreciated that I-NSSAI(s) and/or NSSAI(s) or part of it/them may be changed and/or reallocated in mid or at the invocation of a PDU (or other user related) session. Alternatively, some implementations contemplate reallocations that may require the termination of a particular PDU session and the initiating of a new PDU session.

In many example implementations, it may be preferable to confirm the I-NSSAI(s) and/or NSSAI(s) by the network (such as by a core network control plane function, for example) before providing them to charging related elements (as well as other elements contemplated herein). If not, the confirmed values of I-NSSAI/NSSAI should be provided to the charging elements, especially if the I-NSSAI/NSSAI(s) change.

It will be appreciated that, the messages described herein may be messages between separate entities and/or within an entity, and/or may be represented by accessing (such as through writing and/or reading, for example) a cloud-based and/or other temporary or permanent data repository. Thus, the elements may fully and/or partially be implemented as virtual elements within an element, separate physical elements or combinations of such, or combinations of all of these. For example, for each I-NSSAI or NSSAI there may be different physical or logical charging elements used and thus, different interfaces are also used over which I-NSSAI/NSSAI(s) are provided to charging and/or other elements.

Some example implementations contemplate situations involving the use of complementary, alias, and/or partial NW slices for non-supporting UE, including but not limited to situations involving small cells, roaming, and mobility cases. In some such implementations an NW-only slice may be appropriate. For example, an I-NSSAI may be used only in the network or part of the network to replace a full system NW slice and not sent to the UE. In such an example implementation, this I-NSSAI may be used to indicate authorized access, admission control, resource allocation and/or allowed services in the area where it is valid. Moreover, an example of non-supporting UEs is an older version ("legacy") UE which does not support some of all of the NW slicing procedures, messages and/or parameters.

Such example implementations may exhibit a number of beneficial characteristics. For example, the NW slice may be used with a non-supporting UE that does not support the NW slicing, but in the NW (RAN, core, or the like, for example) the same procedures and solutions can be used as with normal NW slicing solutions. Moreover, such implementations may be used in specific or partial areas for the UE and its PDU connections in those areas so that general NW slicing procedures and solutions can be used and existing registration/mobility and/or PDU connections do not need to be terminated and re-established with the new NSSAI. Such implementations may also be used for partial areas when the UE re-attaches in order to change the NW slice. For example, if the UE wishes to use a service which is not supported by the one particular NW slice, in such a case, only changing the I-NSSAI would not fully resolve the issue, (such as in a roaming case with home routed traffic, if UE is in small cell where only data connections are supported, for example). Moreover, such example implementations, may be used to avoid sending the new or partial NW slice (I-NSSAI) to the UE if deemed not necessary for supporting one or more UEs.

While the method, apparatus and computer program product of an example embodiment may be deployed in a variety of different systems, one example of a system that may benefit from the NW slicing and/or complementary NW slice allocation procedures discussed and contemplated herein in accordance with an example embodiment of the present invention is depicted in FIG. 1. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, the system environment includes one or more user equipment (UE) 102 configured to communicate wirelessly, such as via an access network, with a network 106. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems. System environment 100, as depicted in FIG. 1, also includes one or more access points 104a and 104b, such as base stations, including but not limited to node Bs, evolved Node Bs (eNB), or the like. A cellular access point, such as a base station, may define and service one or more cells. The access points may, in turn, be in communication with a network 106, such as a core network via a gateway, such that the access points establish cellular radio access networks by which the user equipment 102 may communicate with the network. The system environment 100 of FIG. 1 may include a plurality of different cellular radio access cells and/or networks or parts of such networks including, for example, a 5G radio access, an LTE radio access, a UMTS (universal mobile telecommunications system) radio access, etc. In some example implementations, equipment and other infrastructure associated with multiple different cellular radio access networks may be located at or near structures and/or other equipment associated with a particular access point, such as access point 104a and 104b.

In some implementations of system environment 100, the cellular radio access networks serviced by access points 104a, 104b, and any other access points in a given area are identical, in the sense that as user equipment 102 moves from an area serviced by access point 104a to an area serviced by access point 104b, the user equipment 102 is able to access the network 106 via a radio access network provided across access points. Although not shown, the system may also include a controller associated with one or more of the cellular access points, such as, base stations, for example, so as to facilitate operation of the access points and management of the user equipment 102 in communication therewith. As shown in FIG. 1, a system may also include one or more wireless local area networks (WLANs), each of which may be serviced by a WLAN access point 108 configured to establish wireless communications with the user equipment. As such, the user equipment may communicate with the network via a WLAN access point as shown in solid lines in FIG. 1, or, alternatively, via a cellular access point as shown in dashed lines. The radio access networks as well as the core networks may consist of additional network elements as routers, switches, servers, gateways, and/or controllers.

When a UE moves outside of its current NW slice application area, its services may be provided over a complementary network slice. In this regard, the implementation and/or allocation of a complementary network slice within a network environment can be accomplished by an apparatus 200 as depicted in FIG. 2. The apparatus may be embodied by and/or incorporated into one or more UEs, such as user equipment 102, or any of the other devices discussed with respect to FIG. 1, such as access points 104a and/or 104b, one or more of WLAN access points 108, and/or devices that may be incorporated or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, including but not limited to a smartphone, a tablet computer, or the like, for example.

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 3 is a block diagram of an example system architecture 300 that may be used in example implementations of embodiments of the invention involving mobility of a UE outside its main NW slice (I-NSSAI) area, and may also be used in example implementations of embodiments of the invention involving a roaming UWE with home-routed traffic. It will be appreciated that example system architecture 300 is only meant to serve as an example within which certain aspects of embodiments of the invention may be discussed and presented, and is not intended to limit the scope of the invention. It will be appreciated that alternate system architectures may be used in other example implementations of embodiments of the invention and may be based at least in part on the particular network environment, context, use case, and other factors.

As shown in FIG. 3, example system architecture 300 is generally divided into two portions, shown as 302 and 310. In example implementations involving a UE's mobility outside of its main NW slice/slice instance (NSSAI/I-NSSAI) area, portion 302 may be considered the main NW slice/slice instance (NSSAI/I-NSSAI) area, where the main NW slice/slice instance (NSSAI/I-NSSAI) is not used. As depicted in FIG. 3, the main NW slice/slice instance (NSSAI/I-NSSAI) 302 contains modules 304, which handles AF functions, 306, which handles control plane (CP) functions, and 308, which handles user plane (UP) functions, each of which are interconnected and may interact with each other.

In example implementations involving a UE's mobility outside of its main NW slice area, portion 310 may be considered to be the non-main NW slice area, where the main NW slice (I-NSSAI) is not supported, and where a new and/or complementary I-NSSAI is allocated for this area. As shown in FIG. 3, the UE 312 and an access node (AN) 314 are located in non-main NW slice area 310, along with modules 316 and 318, which are configured to handle CP functions and UP functions, respectively. As shown, the UE 312 is capable of communicating with the AN 314 and the CP function module 316, and the remaining components of portion 310 are also capable of communicating with each other. In some example implementations, the UE 312 may be originally located in the non-main NW slice area 310, or could move to area 310 while registered and/or while having PDU connections with the main NW slice. In such implementations, the new I-NSSAI may or may not be sent to the UE. It will be appreciated that in the example shown in FIG. 3, the main NW slice area 302 is that the areas where the main NW slice (I-NSSAI) is not used.

As noted herein, FIG. 3 and the example system architecture 300 may also be used in example implementations that illustrate the applicability of complementary NW slices to roaming cases that involve home-routed traffic. In some such example implementations, portion 302 may be considered the home PLMN (HPLMN), and modules 306 and 308 may be configured to handle home control plane (H-CP) functions and home user plane (H-CP) functions, respectively. Likewise, in such example situations, portion 310 may be considered to be the Visited PLMN (VPLMN), and modules 316 and 318 may be configured to handle visited control plane functions, and visited user plane functions, respectively. With respect to network slices, the NW slice associated with VPLMN 310 may be allocated and used based on the policies associated with the VPLMN 310. Likewise, HPLMN 302 may use a partial I-NSSAI in accordance with its policies, as the VPLMN NW slice may be interpreted differently in the HPLMN and/or may be unknown to the HPLMN. In some example implementations, the NW slice (I-NSSAI) associated with the HPLMN may be saved and/or otherwise correlated with the VPLMN NW slice, as doing so may allow for the implementation of additional functionality, such as the correlation of VPLMN charging records, for example. Correlation may take place by, for example, explicitly exchanging "normal NW slice id" with "complementary NW slice id", or only providing "complementary NW slice" and/or using pre-configurations.

FIG. 4 depicts an example system environment 400 which may be used in example implementations of embodiments of the invention. As with other example system environments depicted and described herein, example system environment 400 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 4, and the system environment 400 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 4 are shown as discrete, separate elements, other configurations may be used in connection with the methods, apparatuses, and computer programs described herein, including configurations that combine, omit, and/or add aspects and/or components.

Some example implementations that may take advantage of system environment 400 may be advantageous in situations that involve X2, X2-like, Xx, and Xx-like interfaces, as well as intra-RAN central and/or distributed function interfaces (such as those used in connection with front haul between the lower and upper layers and/or distributed and/or centralized elements of a RAN, for example). Example implementations that involve aspects of multi-RAT (consisting of networks or elements of different radio access technologies such as 5G, LTE, etc.), and/or intra-RAT, IWK, dual connectivity, and/or carrier aggregation contexts may also involve system environments similar to example system environment 400. As shown in example system environment 400, complementary NW slice area 402 includes a 5G RAU 404 and a 5G RAC 406, which are configured to communicate with each other within the complementary NW slice. Example system environment 400 also includes at least one S-GW 408, an eNB 410 and an MME 412, which reside outside of the complementary NW slice area and use the normal NW slice area. As shown in FIG. 4, the MME 412 and eNB 410 are configured to communicate with each other, and may do so via S1-MME, for example. The eNB 410 may communicate with the 5G RAC 406, via, for example, S1-U for 5G RRC, S1-U, and/or proprietary controls featuring X2-type interfaces. The eNB 410 is also in communication with the S-GW 408, and may do so via S1-U, for example. As shown in FIG. 4, the S-GW 408 may communicate with the 5G-RAC 406, which is located within the complementary NW slice via S1-U and/or S1-U for 5G RRC, for example.

FIG. 5 depicts a block diagram of a network portion 500 that illustrates the interaction of supporting and non-supporting UEs with respect to an NW slice that may be available via a particular RAN node. It will be appreciated that FIG. 5 and the network portion depicted therein is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 5, and the network portion 500 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 5 are shown as discrete, separate elements, other configurations may be used in connection with the methods, apparatuses, and computer programs described herein, including configurations that combine, omit, and/or add aspects and/or components.

As shown in FIG. 5, network portion 500 includes a UE 502, and RAN node 504, and network slice selection function NSSF module 506, and a home subscriber server (HSS) 508. As depicted, an NW slice 510 may be a selected network slice, in which a number of network functions (NF) 512 may be performed. As depicted in the example shown in FIG. 5, the NFs 512 within the selected network slice 510 may include, for example, a control plane (CP) entry point 512A, a first control plane network function (CP NF) 512B, and second CP NF 512C, a first user place network function (UP NF) 512D, and a second UP NF 512E. It will be appreciated that the number, content, and/or configuration of the network functions associated with a network slice may vary from the example depicted in FIG. 4 without departing from the scope of embodiments of the invention.

In some example implementations that arise in network portion 500, the network may be able to determine if the UE 502 is NW slicing capable based on UE reporting, which may include, for example, information about the UE's capabilities, software version(s), UE model, and the like, for example, and/or saved, previously reported information on the UE's NW slicing capabilities. In example implementations where the UE is not capable of using the NW slice, the NW slice information may not be passed to the UE, and the NW slice may be otherwise allocated and/or used by the network. In example implementations where the UE 502 is capable of interacting and/or otherwise operating in a sliced network environment, the NW slice (NSSAI/I-NSSAI) may be allocated and used in the network and by the UE 502. This may be particularly useful in contexts involving emergency services, visiting roaming subscriber support and/or services (frequent or infrequent) for which the network operator has defined sets of default settings that are different from those typically used in the network, such as settings covering access and/or admission control, the support of certain services, PCC rules, QoS settings or the like, for example.

FIGS. 6-12 present a series of message flow sequence charts that illustrate several aspects of complementary NW slicing and implementations of example embodiments of the invention that incorporate complementary network slicing. It will be appreciated that while many of the examples depicted in FIGS. 6-12 present message flow sequences that follow a particular order, the order of actions and messages may vary. Moreover, the message flows are meant to present illustrative examples, and are not intended to restrict the embodiments of the invention to the exclusion of additional steps or actions that may occur in other example implementations. Moreover, it will be appreciated that the architectural composition of networks used in example implementations of embodiments of the invention may vary from those shown or implied by the figures. Moreover, additional elements and functions may be involved, and elements and functions shown may be combined. It will also be appreciated that, for the purposes of clarity, not all parameters in the messages are described.

Depending on the particular implementation in which a message flow may arise, the NW slice information may not be included in all of the indicated messages, as doing so may be unwarranted and/or otherwise unnecessary. While many of the example messages flows describe a single flow done on a per-NW slice bases, the message flows shown in FIGS. 6-12 maybe be done per NW slice instance (such as on a NSSAI/I-NSSAI(s) basis, for example) or for several or all of them together (for example, if multiple NW slice instance areas and elements are the same, for example). In some of the examples discussed and disclosed herein, the term "UE" and the term "subscriber" are used interchangeably. Likewise, the terms "node", "element" and "function" are used interchangeably, and are not intended to unnecessarily limit the applicability of embodiments of the invention to particular network architectures.

Some example implementations of the message flows and/or other aspects of this disclosure contemplate the use of one or more of a subscription database (such as a subscriber repository, HSS, or the like, for example), a policy and charging control element, and one or more local databases which may provide information on allowed NW slices and/or complementary NW slices and their mapping and/or correspondence to each other on subscriber, subscriber group, PLMN, or the like, bases, for example. This information may be provided to core NW and RAN elements dynamically (such as when UE resources are reserved for the UE in those elements, for example). While such functionality and operation is shown, discussed, and/or otherwise contemplated in connection with some of the flows depicted in FIGS. 6-12, it should be appreciated that such information exchange may also be implements in cases involving RAN flows (such as flows involving a source RAN and/or a Master RAN node which receives or has received such information when the UE has originally moved to the RAN node, for example), even if such information exchange is not explicitly shown.

In some example implementations, the message flows and related components are configured such that, when complementary NW slice(s) (instance(s)) have been selected, such selection can be provided to rest of the elements involved in the message flows with the normal NW slice which the complementary NW slice(s) replaces fully and/or partially. This may be effective to indicate which NW slice is replaced by which complementary NW slice. Alternatively, only the Complementary NW slice or the normal NW slice may be used in the messaging (such as if local and/or shared databases are used for the NW slice-complementary NW slice mapping, for example).

Overall, many of the message flows disclosed herein are intended to illustrate that, for a new area which is not within an old NW slice instance area, a new complementary slice is selected and used in new area. For example, the information of associated with new complementary NW slice may be typically exchanged between the elements of a network environment, but could also be omitted, (such as if saved and available through other means, including but not limited to a shared data layer and/or database, for example). Moreover, the UE could be informed (such as, provided the complementary NW slice information, for example) or not informed (such as for non-supporting UEs, for example). If the complementary NW slice is provided to the UE, the UE may use it afterwards when contacting the RAN and/or core NW.

Some of the message flows depicted in FIGS. 6-12, and other example implementations of embodiments of the invention contemplate the existence and use of one or more of the following complementary NW slice selection entities:

Some implementations contemplate a NW based handover via the core network. If information is available in old control (or selection) plane and/or a NW selection function, a final and/or only selection of a complementary NW slice may involve a new control (or selection) plane and/or a NW selection function.

Some implementations contemplate a NW based handover over an X2 type interface (including Multi-RAT and/or one RAT dual connectivity and/or Interworking scenarios). If information is available in old (or source) RAN node, a final and or only selection of a complementary NW slice many involve a new (or target) RAN node.

Some implementations contemplate a UE based handover via the core network. If information is available in an old (or source) RAN node (such as before handover (HO) in a target cell, frequency, and/or RAT selection, for example) and/or an old (or source) control (or selection) plane and/or NW selection function, a selection of a complementary NW slice may involve a new control (or selection) plane and/or a NW selection function.

Some implementations contemplate a UE based handover over and X2 type interface (including Multi-RAT and/or one RAT dual connectivity and/or Interworking scenarios). If information is available in an old (or source) RAN node (such as before handover, in a target cell, frequency, and/or RAT selection, for example) a final and/or only selection of a complementary NW slice may involve a new (or target) RAN node.

Some example implementations contemplate relocation, in the core network for situations where an RRC is idle and in a RAN node for situations where a RRC is connected but inactive. In such situations, a selection of a complementary NW slice may involve a new (or target) control (or selection) plane and/or a NW selection function (such as when an RRC is idle and/or an RRC is connected yet inactive, for example). The selection of a complementary NW slice may also involve a new (or target) RAN node (such as when an RRC is connected yet inactive, for example).

Regardless of the particular context in which a complementary NW slice is selected and/or allocated, the UE may be provided with the complementary NW slice instance information. Moreover, in some example implementations, local configurations, subscription data information and/or PCC information may be used to select the complementary NW slice instance FIG. 6 depicts an example message flow 600 that may be used to illustrate how complementary NW slice (such as an equivalent NW slice) information may be provided and/or pre-selected at the time of an attach request. In some example implementations of message flow 600, a complementary NW slice and a mapping (and/or correspondence information) between an NW slice and a complementary NW slice may be fetched and/or determined at the time of an initial attach. In some such example implementations, this information may be provided to a RAN node. Moreover, this information may also be partially and/or fully configured a different core and/or RAN nodes, or at the related databases and fetched at the time of initial attach or later.

In some example implementations, an NW slice instance may be selected at another time, such as at the time of an additional registration, PDU connection setup, service initiation, or the like, for example, and it will be appreciated that the complementary NW slice and/or slice instance determination may take place in a manner similar to that reflected in FIG. 6 and discussed herein.

As shown in FIG. 6, message flow 600 involves the movement of messages and/or other information between a RAN node 602, an NW slice and/or control plane (or selection function) 604, a subscription databases (such as an HSS and or other subscriber repository) 606 and a policy and charging control function 608. As shown at message 610, message flow 600 commences with an attach request (which may include, for example, an indication of an NW slice, service information, a temporary identification, and/or an I-NSSAI, for example) from RAN node 602 to the NW slice and/or control plane (or selection function) 604. NW slice/control plane selection function 604 subsequently transmits message 612 to the subscription database 606. In some example implementation, message 612 includes a subscription data request. The responsive message 614, which may include a set of subscription data, NSSAI information, and/or complementary NSSAI information, is sent back from the subscription database 606 to the NW slice/control panel selection function 604. Upon receipt of the responsive message 614, the NW slice/control panel selection function 604 transmits message 616, which may include PCC data (such as NW slice, usage class, and/or service information, for example) to the policy and charging control function 608. In response to receipt of the message 616, the policy and charging control function 608 responds with message 618, which may contain policy rules (such as those associated with a particular NW slice and/or complementary NW slice).

In some example implementations of message flow 600, a UE's NW slice (such as an I-NSSAI is selected at the time of attach, and the complementary slice-specific information may be fetched and/or otherwise retrieved from the subscription database (such as subscription database 606) and/or a PCC element, (such as policy and charging control function 608). However, local configurations may also be used to select an NW slice.

As shown at message 620, a UE context creation and/or attach acknowledgment (which may contain, for example an indication of a NW slice, an I-NSSAI, and/or one or more complementary NW slices) is passed from the NW slice control function 604 to the RAN node 602, which may then, via message 622, pass the attach acknowledgement (including information regarding the NW slice instance (such as an I-NSSAI, for example) to a UE.

FIG. 7 depicts an example message flow 700 that may be used to illustrate how complementary NW slice (such as an equivalent NW slice) information may be handled in an old (or source) control plane (or selection) element at handover. For example, message flow 700 may be advantageous in situations involving an NW-based handover via the core network, such as when a UE moves outside the current NW slice instance (such as an I-NSSAI, for example) area.

As shown in FIG. 7, message flow 700 involves the movement of messages between an old (or source) control plane and/or NW slice selection function 702 and a new (or target) NW slice and/or control plane selection function 704. Message flow 700 commences when message 706 is received at the old control plane/NW slice selection function 702. In some example implementations, message 706 is a handover request transmitted by an old RAN node. In some example implementations of message flow 700, the old (or source) control plane element 702 selects a target control plane node and/or complementary NW slice instance by using local, network, and/or roaming configurations which may contain information on suitable complementary NW slice instance(s) and/or a UE's HSS and/or PCC-provided NW slice information (such as allowed NW slices (and/or NSSAI/I-NSSAI), for example), complementary NW slice information (such as NSSAI/I-NSSAI information, for example), and/or UE usage and/or service type information. Subsequently, and as shown in message 708, the old (or source) control plane element 702 then provides a relocation request message to the new NW slice/control plane function 704. In some example implementations, the relocation request message sent as message 708 includes information regarding and/or an identification of the currently used NW slice instance, the complementary NW slice to be used in the target node for the UE and/or both. In some example implementations, the relocation request transmission in message 708 may also include information regarding the UE usage and/or service types.

FIG. 8 depicts an example message flow 800 that may be used to illustrate how complementary NW slice (such as an equivalent NW slice) information may be handled in a new (or target) network at handover. For example, message flow 800 may be advantageous in situations involving an NW-based handover via the core network, such as when a UE moves outside the current NW slice instance (such as an I-NSSAI, for example) area.

As shown in FIG. 8, message flow 800 involves the movement of messages between a UE 802, a new (or target) RAN node 804, an old (or source) NW slice control plane/selection function 806, an old (or source NW slice user plane function 808, a new (or target) NW slice control plane/selection function 810, a subscription database (such as an HSS or other subscriber repository) 812, a new (or target policy and charging control function 814, a new (or target) NW slice control plane function 816, and new (or target NW slice/user plane function 818, and an old and new user plane anchor function 820. However, it will be appreciated that other arrangements of elements may be used in example implementations of message flow 800 and/or other similar message flows.

As shown in FIG. 8, message flow 800 commences with the transmission of message 822 from the old NW slice/control plane selection function 806 to the new NW slice/control plane selection function 810. In some example implementations, message 822 is a relocation request message, which may contain information associated with a current and/or complementary NW slice instance (such as one or more I-NSSAIs, NSSAIs, and/or UE usage and/or service types). The new NW slice/control plane selection function 810 may optionally transmit message 824 (which may contain a subscription data request) to the subscription database 812. In such optional implementations, the subscription database 812 may respond with message 826, which may contain responsive subscription data, such as identifications of relevant NSSAIs and/or complementary NSSAIs. The new NW slice/control plane selection function 810 may also optionally transmit message 828 to the new policy and charging control function 814. In some example implementations, message 828 include a PCC request (which may involve NW slice instance(s) information, as well as usage and/or service information). In response the policy and charging control function 814 may optionally transmit message 830 back to the new NW slice/control plane function to provide PCC rules, such as those associated with a particular NW slice and/or complementary NW slice.

As shown at message 832, the new NW slice/control plane function selects the complementary NW slice instance and corresponding local control (and/or user plane) elements (and resources) for the UE, and transmits the relevant message (which may contain, for example an identifier, information regarding complementary NW slice instances, and/or related policies, for example) to the new NW slice user plane function 818. In some implementations, the new NW slice/control plane function 810 selects and/or adopts a complementary NW slice instance based at least in part on the information received from the old NW slice/control plane selection function 806 and may also incorporate information associated with local, network, and/or roaming policies and agreements, local PCC functionality, as well as information received from the subscription data repository 812 to receive UE specific information. In some example implementations, the new control and user plane functions 810, 816, and/or 818 may deploy specific QoS, admission/access control, service, charging, and other rules and policies based on the complementary NW slice instance in the core and RAN NWs and/or other nodes (such as application servers, for example). Moreover, and as discussed in more detail with respect to messages 860 and 862, information regarding the complementary NW slice may be provided to the UE, such as in RRC or NAS messages as part/in conjunction with one or more handover (HO) messages or as a separate action.

As shown in messages 834 and 836, the new NW slice/control function 816 and the new policy and charging control function 814 may optionally interact to requests and provide PCC rules in a manner similar to that used in connection with messages 828 and 830.

As depicted in FIG. 8, message flow 800 proceeds to message 838, wherein the new NW slice control plane function 816 transmits and user-plane setup request (which may include information involving one or more complementary NW slice instances, for example) to the new NW slice user plane function 818. In response, and as shown in message 840, the new NW slice user plane function selects the relevant resources based at least in part on the relevant complementary NW slice instance. In some example implementations, the new NW slice user plane function 818 may interact with the old and new user plane anchor function 820 to set up a full user plane path. In some such example implementations, the complementary NW slice instance information may be provide to the anchor function 820, which may in turn continue to use the old NW slice instance setting and/or may reallocate resources based on the complementary NW slice information.

As shown at message 842, a handover request (which may include information involving the complementary NW slice instance), is passed from the new NW slice control plane function 816 to the new RAN node 804. Upon receipt of message 842, the new RAN node may verify whether the selected complementary NW slice is valid (such as by confirming the NW slice is valid for the UE's location area and/or tracking area, for example). Upon determining that the complementary NW slice is valid, the new RAN node adopts it and uses the valid policies (such as those related to admission control, QoS, and other services, for example) for the UE and proceeds with the handover establishment, as shown by messages 844 and 846. In instances where NW slicing is not used and/or supported in the RAN, the complementary NW slice information may not be sent to the UE. In instances where the UE 802 is informed of the complementary NW slice, that information may be provided to the UE in message 844, or via a separate message. As shown at message 848, message flow 800 continues with a handover acknowledgement from the new RAN node 804 to the new NW slice control plane function 816. Messages 850 and 852 are subsequently received by the old NW slice/user plane function 808 from the old NW slice/control plane function and the new NW slice control plane function 816, respectively, as part of a relocation acknowledgment (which may include information involving the complementary NW slice instance(s) and/or user plane address(es). As shown in messages 854, and 856, which are transmitted from the old NW slice/control plane function 806 to the old NW slice user plane function 808 and from the old NW slice user plane function 808 to the user plane anchor function 820, respectively, information regarding the removal of resources and updates to the user-plane address(es) (which may, for example involve the transmission of information associated with the complementary and/or old NW slice instance(s)) is conveyed to the user plane anchor function 820.

Upon receipt of message 856, the user plane anchor function 820 continues to serve the UE as a new user plane anchor. As such, it may continue to use the old NW slice instance and corresponding policies, services, QoS, and the like, for example, or it may receive and adopt (either fully or partially) the new complementary NW slice settings.

As depicted by message 858, the user plane anchor function 820 may respond to the old NW slice user plane function to trigger the removal of resources and/or the update of user plane address(es). In some instances, message 858 may include an acknowledgment of the complementary and/or old NW slice instance(s).

As shown in FIG. 8, message flow 800 continues with message 860, wherein the new NW slice control plane function 816 provides an NAS message that may include information involving the complementary NW slice instance, to the UE 802. It will be appreciated that the complementary NW slice instance information may be provided to the UE in an RRC or NAS message, which may also include a handover command and/or other RRC and/or NAS messages. As shown as message 862, the UE 802 may positively (or negatively acknowledge the new complementary NW slice instance.

FIG. 9 depicts an example message flow 900 that may be used to illustrate how complementary NW slice (such as an equivalent NW slice) information may be handled in an NW based hand over via X2 and X2-like interfaces, such as when an UE moves outside a current NW slice instance (such as an NSSAI or I-NSSAI) area.

As shown in FIG. 9, message flow 900 involves the movement of messages between a UE 902, an old (or source) RAN node 904, a new (or target) RAN node 906, and an old (or source) NW slice control plane function 908. As shown in FIG. 9, message flow 900 commences when message 910 is sent from the UE 902 to the old RAN node 904. Some example implementations of message 910 involve handover triggering to a target RAN (or cell, frequency, or the like, for example). In some such example implementations, such triggering may be based at least in part on UE measurements, a load based handover, or other information, for example.

As shown at message 912, the old RAN node 904 conveys a handover request to the new RAN node 906. In situations where the old RAN node 904 has local configurations and/or has received or fetched complementary NW slice (such as NSSAI or I-NSSAI, for example) information, the old RAN node 904 may provide the information to the target RAN.

For example, the complementary NW slice instance id (such as I-NSSAI) to be used for the UE may be transmitted to the new RAN node 906.

The new RAN node 906 either receives complementary NW slice instance information from the old RAN node 904 (such as through message 912, for example) or determines the complementary NW slice instance information based on the current NW slice instance for the UE (which may be determined at least in part, for example, on local configurations and/or through fetching the information from a relevant database). Upon receipt or acquisition of the complementation NW slice instance information, the new RAN node 906 may use the NW slice instance for UE admission control, resource reservation, QoS settings, and/or RAN service selection.

As shown as message 914, the new RAN node 906 may respond to the old RAN node 904 with a handover acknowledgment. As shown by message 916, the new RAN node may also provide a handover command to the UE 902. In some example implementations of message 916, the target (or, in alternative implementations, the source) RAN node may provide the complementary NW slice instance information to the UE 902 as part of the handover signaling and/or in a separate NAS/RRC message after the handover or as part of the handover.

Upon receipt of the handover command in message 916, the UE 902 may transmit message 918 to the new RAN node 906 to indicate that the handover is complete. Subsequently, as shown in messages 920 and 922, the new RAN node 906 may interact with the old NW slice control plane function 908 to implementation a path switch (if necessary) and/or to optionally update the NW slice with the complementary NW slice instance, and secure a related acknowledgement from the old NW slice control plane function 908. As shown in message 924, upon completion of the handover and any necessary interaction between the new RAN node and the old NW slice control plane function, the old context is released.

FIG. 10 depicts an example message flow 1000 that may be used to illustrate how complementary NW slice (such as an equivalent NW slice) information may be handled at handover and/or RRC connection reestablishment. In some implementations, message flow 1000 may be advantageous in situations involving a UE-based handover via X2 and/or X2-like interfaces, such as when a UE moves outside the current NW slice instance (such as an I-NSSAI, for example) area. Example implementations of message flow 1000 contemplate that one or more NW slice control and/or user plane elements may be reallocated in the NW due to relocation and/or use of a complementary NW slice.

As shown in FIG. 10, message flow 1000 involves the exchange of messages between a UE 1002, a new (or target) RAN node 1004, an old (or source) RAN node 1006, and an old (or source) NW slice control plane function 1008. As shown at block 1010, message flow 1000 arises in the context of a RRC connection reestablishment to a new RAN node, which may be triggered, for example, by a UE-based handover and/or an RRC connection reestablishment after a radio link failure and/or other event. Message flow 1000 includes message 1012, wherein the new RAN node 1004 seeks to fetch UE context information form the old RAN node 1006. In some implementations of message flow 1000, if the old RAN node 1006 has local configurations and/or has received or fetched complementary NW slice information, it may provide such information to the new RAN, as shown in message 1014. In some instances, the complementary NW slice instance ID (such as an I-NSSAI) may be used for the UE and provided in message 1014.

The new RAN node 1004 either receives the relevant complementary NW slice instance information from the old RAN node 1006 (such as through message 1014, for example) or determines the complementary NW slice instance information based on the current NW slice instance for the UE (which may be determined at least in part, for example, on local configurations and/or through fetching the information from a relevant database). Upon receipt or acquisition of the complementation NW slice instance information, the new RAN node 1004 may use the NW slice instance for UE admission control, resource reservation, QoS settings, and/or RAN service selection, for example.

As shown in messages 1016 and 1018, the new RAN node may transmit a handover command to the UE 1002 and receive a responsive acknowledgement upon completion of the handover. In some example implementations of message 1016, the new (or, in alternative implementations, the old) RAN node may provide the complementary NW slice instance information to the UE. While such information may be provided as part of the handover command 1016, it may alternatively be provided via a separate NAS/RRC message after and/or as another part of the handover.

As shown at messages 1020 and 1022, the new RAN node may also interact with the old NW slice control plane function 1008 to implement a path switch (if necessary and to optionally update the NW slice and/or complementary NW slice instance information. In example implementations where a path switch is necessary, message 1022 may include a path switch acknowledgment message. As shown in block 1024, upon the completion of the handover and any related subsequent interaction between the new RAN node 1004 and the old NW slice control plane function 1008, the old context may be released.

FIG. 11 depicts an example message flow 1100 that may be used to illustrate how complementary NW slice (such as an equivalent NW slice) information may be handled in situations involving dual and/or other multi-connectivity of a UE. Some example implementations of message flow 1100 arise in contexts involving secondary RAN resources (such as cells, for example) that are fully and/or partially part of a complementary NW slice instance.

As shown in FIG. 11, message flow 1100 involves the exchange of messages between a UE 1102, a master RAN node 1104, a secondary RAN node 1106, an NW slice control plane function 1108, and an NW slice user plane function 1110. Example implementations of message flow 1100 contemplate that one or more NC slice control and/or user plane elements may be reallocated in the NW due to relocation and/or the use of one or more complementary NW slices. Moreover, while not depicted in FIG. 11, some example implementations of message flow 1100 contemplate the use of data forwarding.

Example implementations of message flow 1100 typically commence with a decision at the master RAN node 1104 to deploy dual and/or other multi connectivity and cell(s) in a secondary RAN node, such as secondary RAN node 1106. In some situations, master RAN node 1104 may know (such as by local configuration or by fetching the information, for example), that the cells or the like in the secondary RAN node 1106 are part of a complementary NW slice. As such, when the master RAN node 1104 initiates the secondary RAN node addition request (which is depicted as message 1112) the secondary RAN node addition request may include information on the current NW slice(s) and/or complementary NW slices.

As depicted in FIG. 11, the secondary RAN node 1106 either receives the relevant complementary NW slice instance information from the master RAN node 1004 (such as through message 1112, for example) or determines the complementary NW slice instance information based on the current NW slice instance for the UE (which may be determined at least in part, for example, on local configurations and/or through fetching the information from a relevant database). Upon receipt or acquisition of the complementation NW slice instance information, the secondary RAN node 1106 may use the NW slice instance for UE admission control, resource reservation, QoS settings, and/or RAN service selection, for example.

In implementations that involve multi connectivity, it is possible that different allocated cells in the RAN nodes belong to different (and potentially complementary) NW slices, as they may offer different services. Thus, it is possible that in one RAN node, one cell associated with the multi connectivity implementation belongs to the normal or current NW slice and another cell is part of a complementary NW slice. In implementations that arise from the use of different RAT/AT ((Radio) Access Technologies) for dual and/or multi connectivity, it is possible that they consist of different NW slices. For example, a 5G cell could form a special complementary NW slice with higher bit rates but with limited services (such as no VoLTE like voice service and/or real time support, for example).

In some example implementations, and as depicted in FIG. 11, the secondary RAN node 1106 transmits message 1114 (which may take the form of a secondary RAN node addition request acknowledgement) back to the master RAN node 1104.

As shown in messages 1116 and 1118, the master RAN node 1104 may transmit a RRC connection reconfiguration message to the UE 1102 and receive a responsive acknowledgement. In some example implementations of message 1116, the master (or, in alternative implementations, the secondary) RAN node may provide the complementary NW slice instance information to the UE. While such information may be provided as part of the RRC connection reconfiguration message 1116, it may alternatively be provided via a separate NAS/RRC message after and/or as another part of the handover.

As shown at message 1120, the master RAN node 1104 may subsequently notify the secondary RAN node 1106 that the secondary RAN reconfiguration is complete, and may provide to the secondary RAN information associated with the complementary NW slice instance. As shown at messages 1122 and 1124, path modification messages (which may include, for example, E_RAB modification indications and/or bearer modification information, along with and/or independently of complementary NW slice instance information) may be transmitted from the secondary RAN node 1106 to the NW slice control pane function 1108 and the NW slice user plane function 1110, respectively. Related path modification acknowledgements may be transmitted as messages 1126 and 1128 from the NW slice user plane function 1110 and the NW slice control plane function 1108, respectively. As depicted as message 1130, the UE may also notify the secondary RAN node 1106 that the RRC connection reconfiguration is complete. In some instances, message 1130 may involve information regarding the complementary NW slice instance and/or random access aspects.

FIG. 12 depicts an example message flow 1200 that may be used to illustrate how a complementary NW slice may be selected in a new 5G node. Some example implementations of message flow 1200 arise in contexts involving intra-5G RAN mobility with a RAN tracking area.

As shown in FIG. 12, message flow 1200 involves the transmission of messages between a US 1202, a GNB2 1204, an anchor GNB 1206, and NGC control plane 1208, and an NGC user plane 1210. In some example implementations, message flow 1200 commences at message 1212, wherein the UE 1202 sends the GNB2 1204 a RRC location report, (which may optionally include an NW slice identification). Subsequently, GNB2 may transmit, via message 1214, a context retrieval message (which may also optionally include an NW slice identification) to the anchor GNB 1206.

The GNB 1204 either receives the relevant complementary NW slice instance information from the anchor GNB (such as through message 1216, for example) or determines the complementary NW slice instance information based on the current NW slice instance for the UE (which may be determined at least in part, for example, on local configurations and/or through fetching the information from a relevant database). Upon receipt or acquisition of the complementation NW slice instance information, the GNB2 1204 may use the NW slice instance for UE admission control, resource reservation, QoS settings, and/or RAN service selection, for example.

As shown at message 1218, after receiving and/or otherwise acquiring the complementary NW slice information, the GNB2 1204 may transmit a path switch request to the NGC control plane 1208, which may in turn transmit, via message 1220, a request to modify the bearer information to the NGC user plane. As depicted in messages 1222 and 1224, the NGC user plane 1210 and NGC control plane 1208 may respectively respond with the relevant acknowledgment messages.

FIGS. 13A, 13B, and 13C depict example network portion arrangements 1300A, 1300B and 1300C that depict different approaches to allowing a UE 1302 (through an access node (AN) 1304) to multiple core network (CN) slices. As shown in FIG. 13A, arrangement 1300A includes the UE 1302, which is in communication with AN 1304. AN 1304 is in turn in communication with two separate CN instances, 1306 and 1308. As shown in FIG. 13A, CN instances 1306 and 1308 are independently in communication with network 1310, and may each be configured to have exhibit a control plane and/or a user plane. Example implementations of arrangement 1300A are structured such that the UE 1302 obtains services from different network slices and different CN instances. As such, there is a logical separation and/or isolation between the CN instances. Example implementations of arrangement 1300A are characterized by the potential for independent subscription management and/or mobility management for each network slice handling, the UE, and may be achieved readily. However the independence and isolation between CN instances 1306 and 1308, for example, raise potential technical challenges in the form of requiring additional signaling within the network and over the air.

As shown in FIG. 13B, example arrangement 1300B also includes UE 1302 and the AN 1304. In example implementations of arrangement 1300B, the AN 1304 is in communication with block 1312, which provides for CN shared network functions for a single UE and several network slices. Arrangement 1300B also included CN instance slices 1314 and 1316, which are both capable of interacting with network 1310, exhibit a user plane, and are in communication with AN 1304. Unlike arrangement 1300A, however, the CN instance slices in arrangement 1300B are configured to handle only a portion of the control plane, and are in communication with block 1312.

Example implementations of arrangement 1300B typically assume that the identity and/or subscription management and mobility management functions are common between the network slices 1314 and 1316, while other functions (such as the more session-related aspects reside in the individual network slices.

As shown in FIG. 13C, example arrangement 1300C includes UE 1302 and the AN 1304, but assumes that the control plane handling is common between CN network slices 1318 and 1320, such that the control plane functions can be handled by a separate element 1322, which effectively implements a CN shared control plane for one UE and several network slices. As shown in FIG. 13C, CN user plane instances 1318 and 1320 are in communication with network 1310, and maintain independent user planes.

FIG. 14 depicts an example system environment 1400 which implementations in accordance with an example embodiment of the present invention may be performed. As shown in FIG. 14, example system environment 1400 includes an HSS 1402, which is in communication with NG core 1404. As shown in FIG. 14, the NG core 1404 is in communication with an able to interact with an Evolved E-UTRAN 1406 and an NGC 1410. As also shown in FIG. 14, the NG Core 1404 is in communication with an able to interact with a 5G NR 1408 and an NGC UE 1412.

It will be appreciated that the depiction of system environment 1400 in FIG. 14 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 14, and the system environment 1400 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 14 are shown as discrete, separate elements, other configurations may be used in connection with the methods, apparatuses, and computer programs described herein, including configurations that combine, omit, and/or add aspects and/or components.

For example, while FIG. 14 include a depiction of an evolved E-UTRAN 1406, some example implementations of system environment 1400 contemplate the use and/or presence of an E-UTRAN (LTE), which may interface with an evolved packet core (EPC), that in turn is connected to an NG core. Regardless of the precise network architectures and arrangement of network components within an environment such as example environment 1400, it will be appreciated that actions and/or other events associated with handover, cell reselection, RRC connected inactive (or a similar state), and/or idle mode mobility may occur in NW access scenarios involving system environment 1400 and/or variations of system environment 1400. Moreover, it will be appreciated actions and/or other events associated with handover, cell reselection, RRC connected inactive (or a similar state), and/or idle mode mobility may occur between two RAN nodes and/or systems, such that there is a direct X2 and/or X2-type interface between a RAN network and RAN-CN interface from a target RAN node (such as in situations involving 5G/E-EUTRAN with N2 and N3 to NG, or E-UTRAN to S1-MME and S1-U to EPC, for example).

Further, it will be appreciated that actions and/or other events associated with handover, cell reselection, RRC connected inactive (or a similar state), and/or idle mode mobility may occur between two RAN nodes and/or systems such that there is a direct X2-type interface between tight interworking RAN nodes (such as in a E-UTRAN–5G context, for example). Some example implementations contemplate, for example, an SGC bearer (which may involve a bearer over PDCP-NR, for example); a split bearer via MCG (which may involve a bearer split in PDCP-LTE, for example); and/or a split bearer via SCG (which may involve a bearer split in PDCP-NR, for example).

FIG. 15 depicts a block diagram of example network portion 1500 that shows control plane interfaces for network slicing with common and slice-specific functions in which implementations in accordance with an example embodiment of the present invention may be performed. As shown in FIG. 15, example network portion 1500 includes a slice selection function (SSF) 1502, a subscriber repository 1504, a RAN 1506, and common control plan network functions blocks 1508 and 1508A. In the example arrangement shown in FIG. 15, three networks slices are depicted as Slice A 1510, Slice B 1512, and Slice C 1514. As shown, each of slices 1510, 1512, and 1514 include function blocks for their slice-specific control plane network functions (marked as blocks 1510A, 1512A, and 1514A, respectively), and function blocks for their slice-specific user plane network functions (marked as 1510B, 1512B, and 1514B, respectively).

It will be appreciated that the depiction of example network portion 1500 in FIG. 15 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 15, and the example network portion 1500 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 15 are shown as discrete, separate elements, other configurations may be used in connection with the methods, apparatuses, and computer programs described herein, including configurations that combine, omit, and/or add aspects and/or components.

Solutions to at least some of the technical challenges discovered and otherwise addressed in the course of the development of the invention described and otherwise contemplated herein may be performed in connection with implementations of example network portion 1500. As shown in FIG. 15, along with a subscriber repository function 1504, the control plane of a NextGen core may be partitioned into three types of network functions (NFs). First, the slice selection function (SSF) 1502 may be used to handle a UE's initial attach request and new session establishment request by, for example, selecting an appropriate slice for the UE based on the UE's subscription information, UE usage type, service type, and UE capabilities. As shown in FIG. 15, the SSF 1502 may not be specific to a particular network slice.

Second, the common CP NF 1508 (and, as shown in FIG. 15, 1508A) involves the control plane entry function (which may at least include the MM function, AU function, and NAS proxy function, for example). Example implementations of network portion 1500 contemplate that the common control plane is shared amongst different slices. In some example implementations, when different types of network slices are involved in sharing, the required common CP function may vary (as depicted by blocks 1508 and 1508A, for example). However, it will be appreciated that one UE may only access one common CP (such as block 1508 or block 1508A, for example) at a given time.

Third, and as shown in each of slices 1510, 1512, and 1514, there are slice-specific CP NFs associated with each slice (as shown as blocks 1510A, 1512A, and 1514A), which are located on the non-shared slice portions, and may be involved, for example, with SM NF. As shown in FIG. 15, some example implementations contemplate arranges wherein there is no direct interface from RAN 1506 to the slice-specific CP NFs. Moreover, while some example implementations (such as the one depicted in FIG. 15, do not contain a direct interface between the slice-specific CP NFs and the subscriber repository 1504, some example implementations may include one or more such direct interfaces.

In some example implementations, each network slice instance (such as slices 1510, 1512, and/or 1514, for example) may be associated with a network slice-type ID (NeS-ID). In such example implementations, the NeS-ID may be used to identify the type of the slice. Both standardized and PLMN-specific values for an NeS-ID may be possible. Moreover, the NeS-ID may be separated into two parts: a type of common CP and a type of non-shared slice part.

With regards to the type of common CP, when the different types of network slice share the common network function, the common CP may need to accommodate the requirements from multiple difference slices (such as different MM requirements, for example). Consequently, such implementations contemplate that the required common CP function may be different. As such, the type of common CP may be introduced, which may reflect the related requirement to the common CP function from the sharing network slices and/or the individual network slice. It will be appreciated that the type of common CP portion may be a numeric value which does not necessarily directly reflect the sharing network slices. Moreover, the type of common CP may reflect one or more different purposes (such as with the same enterprise customer, the same combination terminal usage, or the like, for example).

The type of non-shared slice part may be used to identify the type of non-shared slice CN parts (such as the eMBB non-shared CN part, for example), that may be involved in a particular implementation.

In some example implementations, a temporary identifier may be assigned to the UE with the UE is successfully registered to the network. For example, the UE temporary ID may be assigned by the common CP NF. Moreover, the UE temporary ID may consist of the routing information to the common CP NF (which may be similar to GUMMEI, for example), and a UE-specific identity (which may be similar to M-TMSI, for example). Even if the UE can simultaneously access multiple network slices, the allocated temporary ID may be a single identifier which is linked to one common CP NF in the network.

Some example implementations of embodiments of the invention disclosed and otherwise contemplated herein involve roaming scenarios. Some example situations contemplate two roaming scenarios. The first scenario may be considered to be a home-routed roaming case, at least in the sense that the traffic from a UE is transferred via the user plane (UP) functions in both a VPLMN and an HPLMN. In such scenarios, the network functions in the VPLMN may cooperate with the network functions in the HPLMN to provide end-to-end services from the roaming UP. The second scenario may be considered to be a local breakout case, at least in the sense that the traffic from a UE is transferred via user plane functions within a VPLMN, and the HPLMN may provide a policy control function for the roaming UE.

FIG. 16 depicts a block diagram of an example roaming reference architecture with supporting slicing 1600, in which implementations in accordance with an example embodiment of the present invention may be performed. In particular, example implementations of the example architecture 1600 may be useful in connection with one or more home-routed roaming scenarios.

It will be appreciated that the depiction of example architecture 1600 in FIG. 16 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 16, and the system environment 1600 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 16 are shown as discrete, separate elements, other configurations may be used in connection with the methods, apparatuses, and computer programs described herein, including configurations that combine, omit, and/or add aspects and/or components.

The implementation of example architecture 1600 depicted in FIG. 16 is generally divided into a VPLMN 1602 and an HPLMN 1604. As shown, UE 1612, interacts with at least one slice of VPLMN 1602 (which is shown as divided into at least two slices). As such, the VPLMN portion slice A 1615 is shown as including a slice selection function (SSF) 1606, a RAN 1616, a block with the common control plane network functions 1618, and slice-specific CP and UP network functions (shown as 1620 and 1622, respectively). As shown in FIG. 16, HPLM 1604 is shown as including a slice selection function (SSF) 1608, a subscriber repository 1610, and at least three slices. As shown in FIG. 16, HPLMN portion slice A 1624 incorporates slice-specific CP and UP network functions 1626 and 1628, respectively.

As shown in FIG. 16, the UE 1612 is in communication with RAN 1616 in the VPLMN portion slice A 1614. The RAN 1616 in turn is in communication with the common CP network functions 1618. As shown, the common CP network functions block 1618 is in communication with and may otherwise interact with the VPLMN sliceslection function 1607, the VPLMN slice-specific CP and UP network functions 1620 and 1622, and the subscriber repository 1610. In some example implementations, including the one shown in FIG. 16, the slice specific CP and UP network functions 1620 and 1622 in the depicted slice 1614 of VPLMN 1602 may be in communication with and may otherwise interact with the slice-specific CP and UP network functions 1626 and 1628 in the slice 1624 of HPLMN 1604.

In some example implementations, the interface between the SSF 1606 associated with VPLM 1602 and the SSF 1608 associated with HPLMN 1604 may allow for the selection of a VPLMN part and an HPLMN part of a network slice. Moreover, and as shown in FIG. 16, the SSF 1606 and the SSF 1608 may be in communication with and may otherwise interact with the subscriber repository 1610.

As described above, FIGS. 6-12 illustrate a message flows that may be implemented as an apparatus 200, a method, and computer program product according to example embodiments of the invention. It will be understood that each aspect of the message flows and combinations of aspects in the message flows, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (e.g., hardware) to produce a machine, such that the resulting computer or other programmable apparatus implements the functions specified in the message flow aspects. These computer program instructions may also be stored in a computer-readable memory that may direct a computer or other programmable apparatus to function in a particular manner, such that the instructions stored in the computer-readable memory produce an article of manufacture the execution of which implements the function specified in the message flow aspects. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the message flow aspects.

Accordingly, message flow aspects support combinations of means for performing the specified functions and combinations of operations for performing the specified functions. It will also be understood that one or more message flow aspects and combinations of message flow aspects, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
causing respective identifiers of one or more complementary network slices including a second network slice instance to be provided to a user mobile device prior to allocation of a respective complementary network slice to the user mobile device, wherein the causing is in response to the user mobile device entering into a tracking area;
detecting that the user mobile device has moved outside of a first network slice instance associated with a first radio access network node, wherein the first network slice instance comprises a control plane function; transmitting, to a second radio access network node, a handover request from the first radio access network node, wherein the handover request comprises a set of information associated with the second network slice instance to be used by the second radio access network node that is complementary to the first network slice instance such that the second network slice instance is configured to cover at least a portion of services associated with the first network slice instance, and wherein the set of information associated with the second network slice instance is obtained by the first radio access network node in response to detecting that the user mobile device has moved outside of the first network slice instance and comprises (i) an instance identifier of the second network slice instance indicative of the second network slice instance to be used by the second radio access network node and (ii) an indication of whether the second network slice instance is intended to replace the first network slice instance fully or partially, wherein the second network slice instance only covers and provides services to part of a network that the first network slice instance is not covering and providing;
receiving, at the first radio access network node from the second radio access network node, a handover acknowledgement message; and
completing a handover of the user mobile device from the first radio access network node to the second radio access network node, such that the second network slice instance is allocated for use by the second radio access network node and at least partially replaces the first network slice instance, wherein, after completion of the handover, the second radio access network node is enabled to update information associated with the first network slice instance or the set of information associated with the second network slice instance via the control plane function.

2. The method of claim 1, wherein detecting that the user mobile device has moved outside of the first network slice instance comprises determining that the user mobile device is physically located outside of a geographic area associated with the first network slice instance.

3. The method of claim 2, wherein completing the handover of the user mobile device from the first radio access network node to the second radio access network node comprises a transmission of a handover command to the user mobile device.

4. The method of claim 3, wherein the second network slice instance is allocated without requiring movement by the user mobile device enabling an increase or decrease in terms of better, worse, or different QoS/network resource allocation/bit rates, services, applications, and different charging plans.

5. The method of claim 4, wherein the set of information associated with the second network slice instance is a set of individual slice selection assistance information (I-NSSAI).

6. The method of claim 5, wherein the second network slice instance is a network slice instance that is not equivalent to the first network slice instance.

7. The method of claim 1, wherein the user mobile device is a unable to use, receive or modify network slices based on having moved outside of the first network slice instance associated with the first radio access network node.

8. An apparatus comprising at least one processor and at least one memory storing computer program code, the at least one memory and the computer program code configured to, with the processor, cause the apparatus to at least:
  in response to a user mobile device entering into a tracking area, cause respective identifiers of one or more complementary network slices including a second network slice instance to be provided to the user mobile device prior to allocation of a respective complementary network slice to the user mobile device;
  detect that the user mobile device has moved outside of a first network slice instance associated with a first radio access network node, wherein the first network slice instance comprises a control plane function;
  transmit, to a second radio access network node, a handover request from the first radio access network node, wherein the handover request comprises a set of information associated with the second network slice instance to be used by the second radio access network node that is complementary to the first network slice instance such that the second network slice instance is configured to cover at least a portion of services associated with the first network slice instance, and wherein the set of information associated with the second network slice instance is obtained by the first radio access network node in response to detecting that the user mobile device has moved outside of the first network slice instance and comprises (i) an instance identifier of the second network slice instance indicative of the second network slice instance to be used by the second radio access network node and (ii) an indication of whether the second network slice instance is intended to replace the first network slice instance fully or partially, wherein the second network slice instance only covers and provides services to part of a network that the first network slice instance is not covering and providing;
  receive, at the first radio access network node from the second radio access network node, a handover acknowledgement message; and
  complete a handover of the user mobile device from the first radio access network node to the second radio access network node, such that the second network slice instance is allocated for use by the second radio access network node and at least partially replaces the first network slice instance, wherein, after completion of the handover, the second radio access network node is enabled to update information associated with the first network slice instance or the set of information associated with the second network slice instance via the control plane function.

9. The apparatus of claim 8, wherein detecting that the user mobile device has moved outside of the first network slice instance comprises determining that the user mobile device is physically located outside of a geographic area associated with the first network slice instance.

10. The apparatus of claim 8, wherein the computer program code is further configured to, with the processor, cause the apparatus to complete the handover of the user mobile device from the first radio access network node to the second radio access network node by causing transmission of a handover command to the user mobile device.

11. The apparatus of claim 10, wherein the handover command comprises an identification of the second network slice instance.

12. The apparatus of claim 8 wherein the set of information associated with the second network slice instance is a set of individual slice selection assistance information (I-NSSAI).

13. The apparatus of claim 8, wherein the second network slice instance is a network slice instance that is not equivalent to the first network slice instance.

14. A computer program product comprising at least one non-transitory computer-readable storage medium having computer-executable program code instructions stored therein, the computer-executable program code instructions comprising program code instructions configured to:
  in response to a user mobile device entering into a tracking area, cause respective identifiers of one or more complementary network slices including a second network slice instance to be provided to the user mobile device prior to allocation of a respective complementary network slice to the user mobile device;
  detect that the user mobile device has moved outside of a first network slice instance associated with a first radio access network node, wherein the first network slice instance comprises a control plane function;
  transmit, to a second radio access network node, a handover request from the first radio access network node, wherein the handover request comprises a set of information associated with the second network slice instance to be used by the second radio access network node that is complementary to the first network slice instance such that the second network slice instance is configured to cover at least a portion of services associated with the first network slice instance, and wherein the set of information associated with the second network slice instance is obtained by the first radio access network node in response to detecting that the user mobile device has moved outside of the first network slice instance and comprises (i) an instance identifier of the second network slice instance indicative of the second network slice instance to be used by the second radio access network node and (ii) an indication of whether the second network slice instance is intended to replace the first network slice instance fully or partially, wherein the second network slice instance only covers and provides services to part of a network that the first network slice instance is not covering and providing;
  receive, at the first radio access network node from the second radio access network node, a handover acknowledgement message; and complete a handover of the user mobile device from the first radio access network node to the second radio access network node, such that the second network slice instance is allocated for use by the second radio access network node and at least partially replaces the first network slice instance, wherein, after completion of the handover, the second radio access network node is enabled to update information associated with the first network slice instance or the set of information associated with the second network slice instance via the control plane function.

15. The computer program product of claim 14, wherein detecting that the user mobile device has moved outside of the first network slice instance comprises determining that the user mobile device is physically located outside of a geographic area associated with the first network slice instance.

16. The computer program product of claim 14, wherein the program code instructions configured to complete the handover of the user mobile device from the first radio access network node to the second radio access network node comprise program code instructions configured to cause transmission of a handover command to the user mobile device.

17. The computer program product of claim 16, wherein the handover command comprises an identification of the second network slice instance.

18. The computer program product of claim 14, wherein the set of information associated with the second network slice instance is a set of individual slice selection assistance information (I-NSSAI).

19. The apparatus of claim 14, wherein the second network slice instance is a network slice instance that is not equivalent to the first network slice instance.

20. An apparatus comprising means for:
causing respective identifiers of one or more complementary network slices including a second network slice instance to be provided to a user mobile device prior to allocation of a respective complementary network slice to the user mobile device, wherein the causing is in response to the user mobile device entering into a tracking area;
detecting that the user mobile device has moved outside of a first network slice instance associated with a first radio access network node, wherein the first network slice instance comprises a control plane function; transmitting, to a second radio access network node, a handover request from the first radio access network node, wherein the handover request comprises a set of information associated with the second network slice instance to be used by the second radio access network node that is complementary to the first network slice instance such that the second network slice instance is configured to cover at least a portion of services associated with the first network slice instance, and wherein the set of information associated with the second network slice instance is obtained by the first radio access network node in response to detecting that the user mobile device has moved outside of the first network slice instance and comprises (i) an instance identifier of the second network slice instance indicative of the second network slice instance to be used by the second radio access network node and (ii) an indication of whether the second network slice instance is intended to replace the first network slice instance fully or partially, wherein the second network slice instance only covers and provides services to part of a network that the first network slice instance is not covering and providing;
receiving, at the first radio access network node from the second radio access network node, a handover acknowledgement message; and completing a handover of the user mobile device from the first radio access network node to the second radio access network node, such that the second network slice instance is allocated for use by the second radio access network node and at least partially replaces the first network slice instance, wherein, after completion of the handover, the second radio access network node is enabled to update information associated with the first network slice instance or the set of information associated with the second network slice instance via the control plane function.

21. The apparatus of claim 20, wherein the means for detecting that the user mobile device has moved outside of the first network slice instance further comprise means for determining that the user mobile device is physically located outside of a geographic area associated with the first network slice instance.

22. The apparatus of claim 20, wherein the means for completing the handover of the user mobile device from the first radio access network node to the second radio access network node comprises a transmission of a handover command to the user mobile device.

23. The apparatus of claim 22, wherein the handover command comprises an identification of the second network slice instance.

24. The apparatus of claim 20, wherein the set of information associated with the second network slice instance is a set of individual slice selection assistance information (I-NSSAI).

25. The apparatus of claim 20, wherein the second network slice instance is a network slice instance that is not equivalent to the first network slice instance.

* * * * *